US005931756A

United States Patent [19]
Ohsono et al.

[11] Patent Number: 5,931,756
[45] Date of Patent: Aug. 3, 1999

[54] METAL V-BELT TYPE CONTINUOUSLY VARIABLE TRANSMISSION

[75] Inventors: Kouhei Ohsono; Toru Yagasaki; Akihito Ohhashi; Shigeru Kanehara; Hirofumi Akagi; Takamichi Shimada, all of Wako, Japan

[73] Assignee: Honda Giken Kogyo Kabushiki Kaisha, Tokyo, Japan

[21] Appl. No.: 09/128,648

[22] Filed: Aug. 4, 1998

[30] Foreign Application Priority Data

Aug. 4, 1997 [JP] Japan ................................. 9-209303

[51] Int. Cl.⁶ .................................................. F16H 55/56
[52] U.S. Cl. ........................... 474/167; 474/28; 475/210
[58] Field of Search .............................. 475/210; 474/8, 474/11, 12, 17, 18, 28, 167, 265

[56] References Cited

U.S. PATENT DOCUMENTS

| | | | |
|---|---|---|---|
| 3,127,780 | 4/1964 | Buhrmann | 474/167 X |
| 3,722,308 | 3/1973 | Steuer | 474/19 |
| 3,783,705 | 1/1974 | Moogk | 474/167 X |
| 4,900,295 | 2/1990 | Tani et al. | 474/167 |
| 5,800,298 | 9/1998 | Kanehara et al. | 474/8 |

FOREIGN PATENT DOCUMENTS

| | | |
|---|---|---|
| 0 798 492 A1 | 10/1997 | European Pat. Off. . |
| 0 828 096 A2 | 3/1998 | European Pat. Off. . |
| 9-264390 | 10/1997 | Japan . |

OTHER PUBLICATIONS

Röper, H. "Anforderungen an die Druckökversorgungseinheit hydraulisch gesteuerter CVT–Getriebe" *Antriebstechnik*: vol. 26 No. 8 (1987) pp. 41–47.

European Search Report, The Hague, Dec. 29, 1998.

*Primary Examiner*—Rodney H. Bonck
*Assistant Examiner*—Sherry Lynn Estremsky
*Attorney, Agent, or Firm*—Armstrong, Westerman, Hattori, McLeland & Naughton

[57] ABSTRACT

A metal V-belt type continuously variable transmission in which the length of a side of an element contacting with a V-face of a pulley is shortened to increase a ratio range. If the element side length of a metal element is represented by L, the angle of the V-face of the pulley is represented by $\alpha$, and the hertz surface pressure between the pulley and the metal element is represented by $\sigma_H$, the following relation is established: L sin $\alpha/\sigma_H^2$. When the hertz surface pressure $\sigma_H$ is determined to be between an upper limit value defined by the wear durability of the metal element and a lower limit value defined by the limit tensile force of an endless belt, the element side length L can be decreased by decreasing the angle of the V-face of the pulley. Thus, the distance through which the metal element can be moved radially of the pulley is increased to increase the ratio range.

2 Claims, 21 Drawing Sheets

METAL V-BELT TYPE CONTINUOUSLY VARIABLE TRANSMISSION

BACKGROUND OF THE INVENTION

1. Field of the Invention

The present invention relates to a metal V-belt type continuously variable transmission including an endless belt which has a large number of metal elements mounted on a metal ring and which is wrapped around a pair of pulleys.

2. Description of the Related Art

A metal V-belt type continuously variable transmission has already been proposed in Japanese Patent Application Laid-open No. 9-264390 by the present assignee, wherein the inclination angle α of the V-groove in the pulley is set in a range of $\tan^{-1} \mu a < \alpha < \tan^{-1} \mu s$, wherein $\mu s$ represents a static friction coefficient between the pulley and a metal element, and $\mu a$ represents a dynamic friction coefficient between the pulley and the metal element, whereby the tensile force of the endless belt is decreased by making the inclination angle α of the V-groove small, and the transmittable torque is increased while avoiding the slipping of the endless belt.

When the metal V-belt type continuously variable transmission performs shifting, if a movable pulley half is moved away from a stationary pulley half, the metal elements are moved radially inwards to decrease an effective radius of the pulley. If the movable pulley half is moved toward the stationary pulley half, the metal elements are moved radially outwards to increase the effective radius of the pulley. In this case, when the distance of radial movement of the metal elements is greater, the ratio can be set in a larger range. For this reason, it is desirable that the length of the side of the element contacting with a V-face of the pulley is decreased to ensure a large movable distance of the metal elements. However, if the element side length is decreased, there is a possibility that a hertz surface pressure acting between the pulley and the metal element may be increased to influence the durability.

SUMMARY OF THE INVENTION

The present invention has been accomplished with the above circumstance in view, and it is an object of the present invention to ensure that the element side length of the metal element is set at an appropriate value to increase the ratio range to the maximum.

To achieve the above object, there is provided a metal V-belt type continuously variable transmission, comprising an endless belt which has a large number of metal elements mounted on a metal ring and which is wrapped around a pair of pulleys, the inclination angle α of a V-groove in the pulley being set in a range of $$\tan^{-1} \mu a < \alpha < \tan^{-1} \mu s$$

where $\mu s$ represents a static friction coefficient between the pulley and the metal element, and $\mu a$ represents a dynamic friction coefficient between the pulley and the metal element, wherein the length L of a side of the element is determined in accordance with the inclination angle α of the V-groove in the pulley and a hertz surface pressure $\sigma_H$ between the metal element and the pulley.

With the above arrangement, the element side length L can be determined at a minimum value to increase the ratio range, based on the hertz surface pressure $\sigma_H$ determined from the viewpoint of the durability of the pulley and the metal element, and the inclination angle α of the V-groove determined from the view point of the fact that the slipping of the endless belt is prevented while enabling the shifting to increase the transmittable torque.

The hertz surface pressure $\sigma_H$ is preferably set at a value ensuring that the tensile force of the metal ring is equal to or less than a predetermined value, and the length L of the side of the element is determined in accordance with the inclination angle α of the V-groove.

With the above arrangement, the element side length L can be determined at a minimum value, while preventing an excessive tensile force from acting on the metal ring.

DETAILED DESCRIPTION OF THE PREFERRED EMBODIMENT

Figure 1:
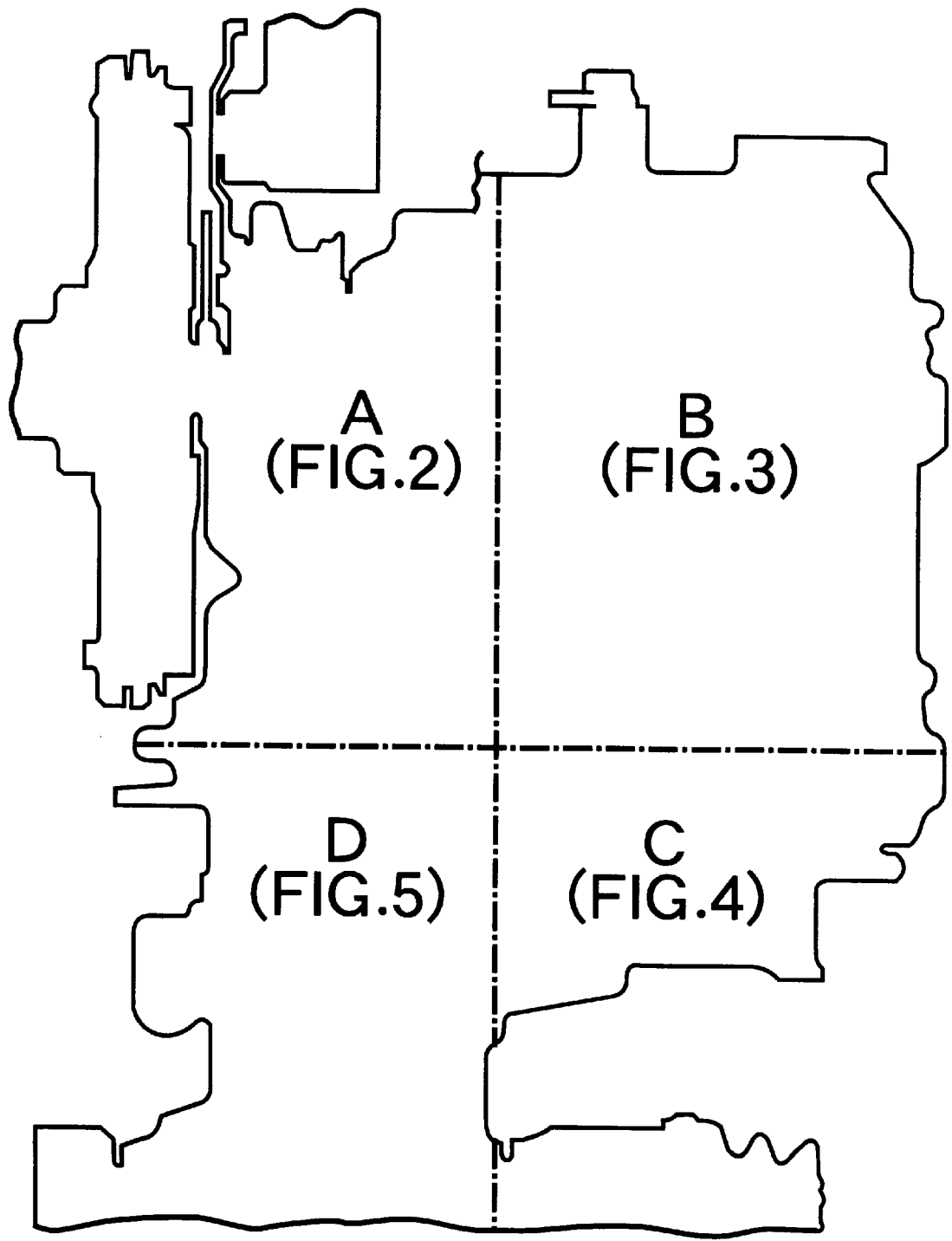
FIG. 1 is a map of a longitudinal sectional view of a belt-type continuously variable transmission.
Figure 2:
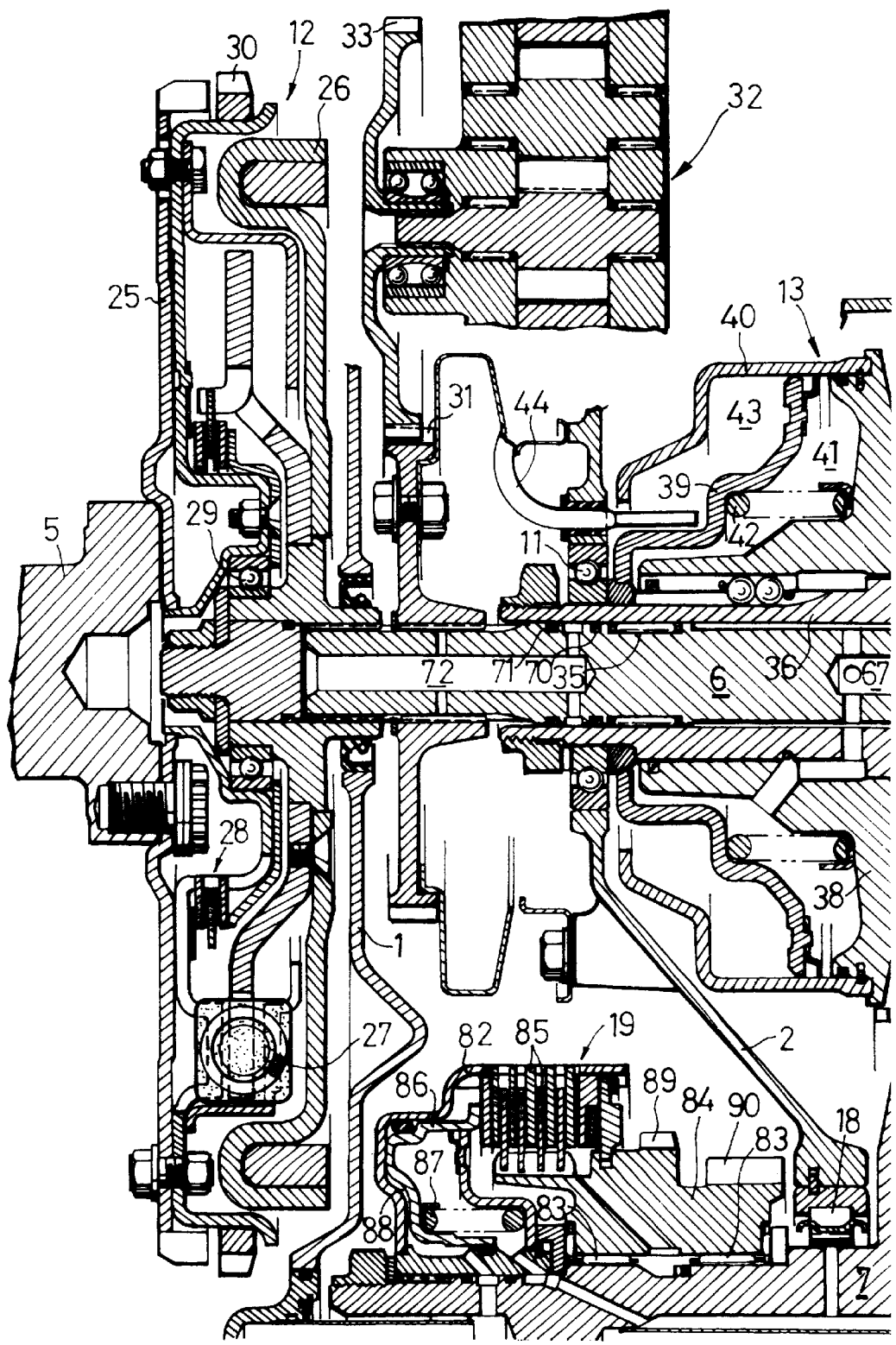
FIG. 2 is an enlarged view of a portion A shown in FIG. 1.
Figure 3:
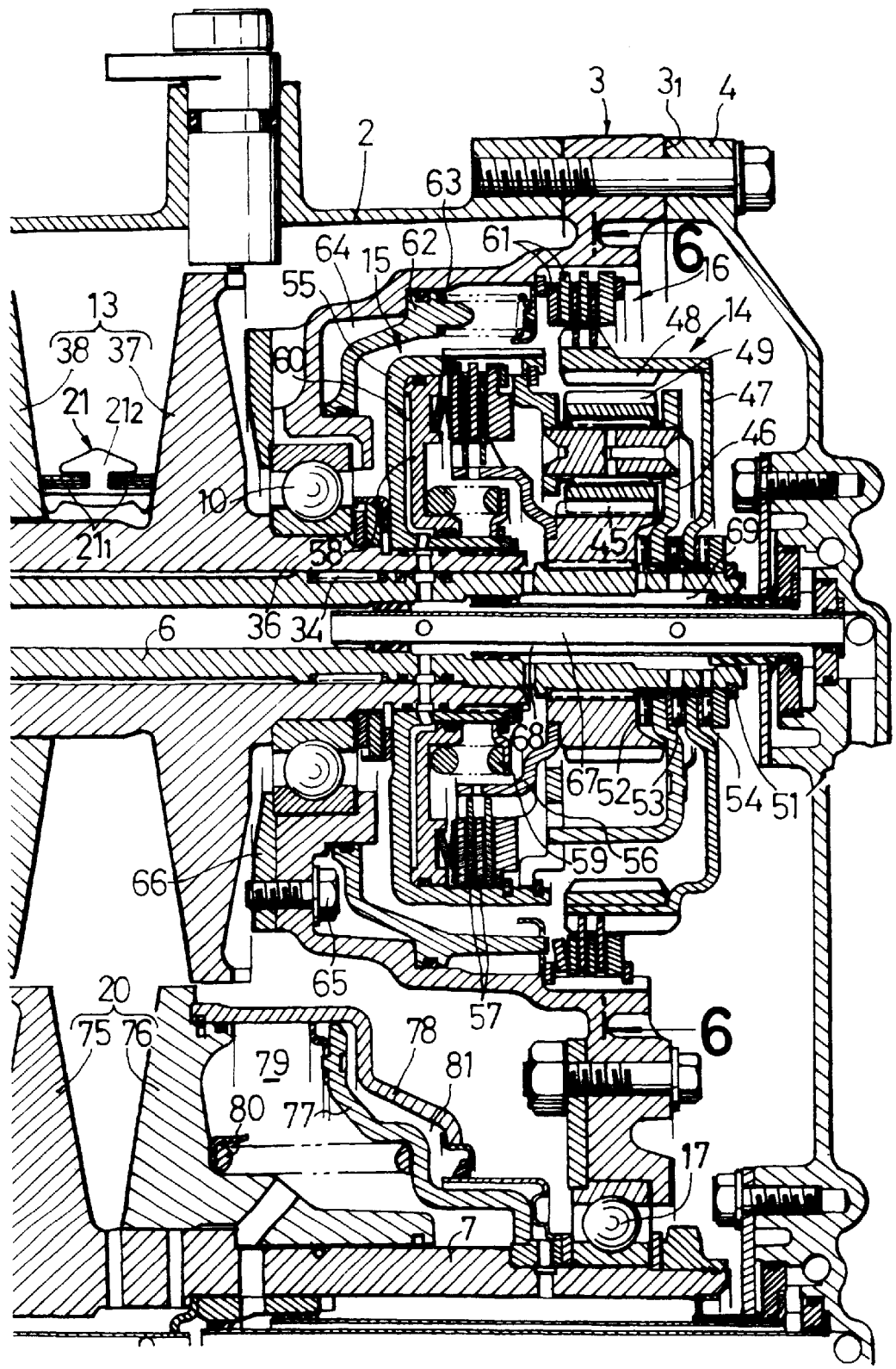
FIG. 3 is an enlarged view of a portion B shown in FIG. 1.
Figure 4:
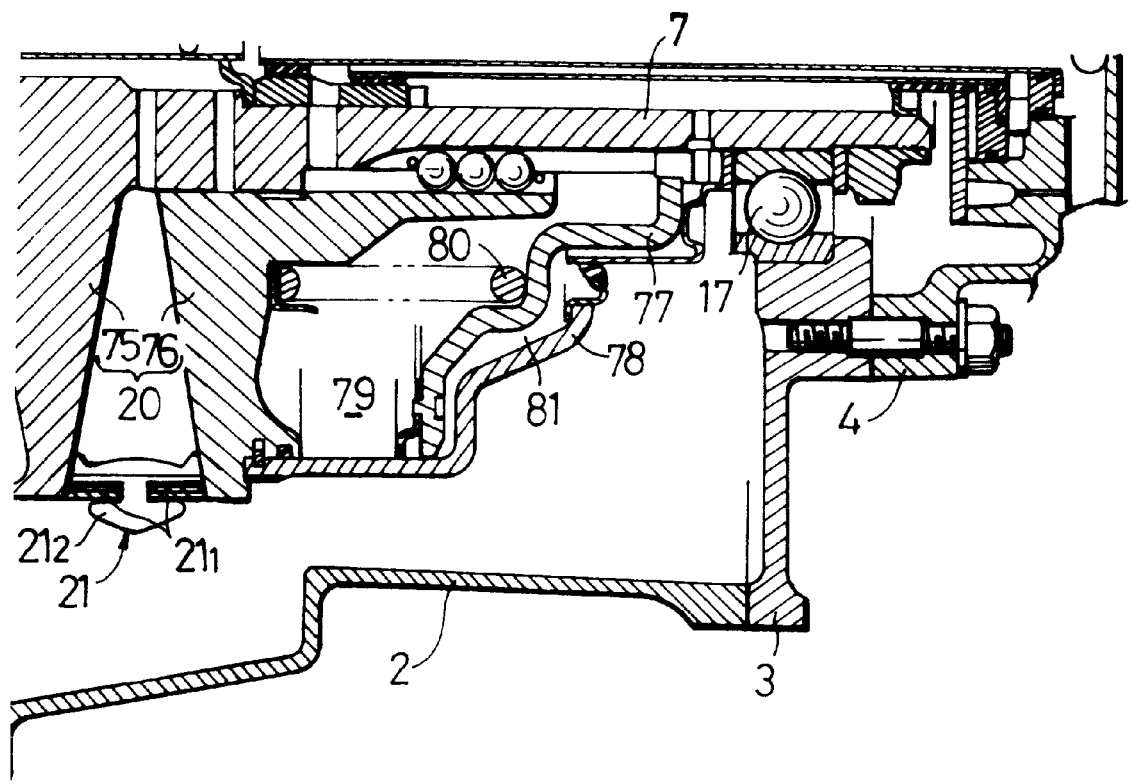
FIG. 4 is an enlarged view of a portion C shown in FIG. 1.
Figure 4:
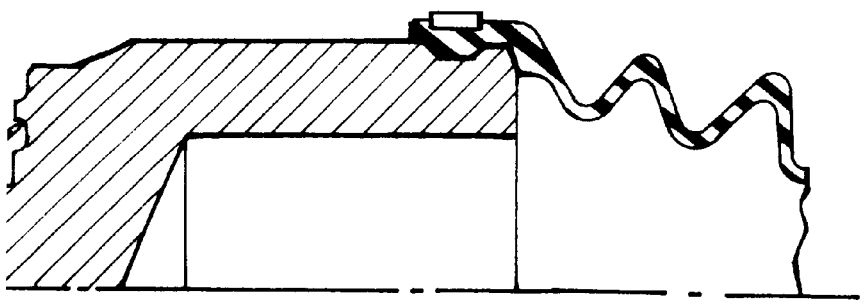
Figure 5:
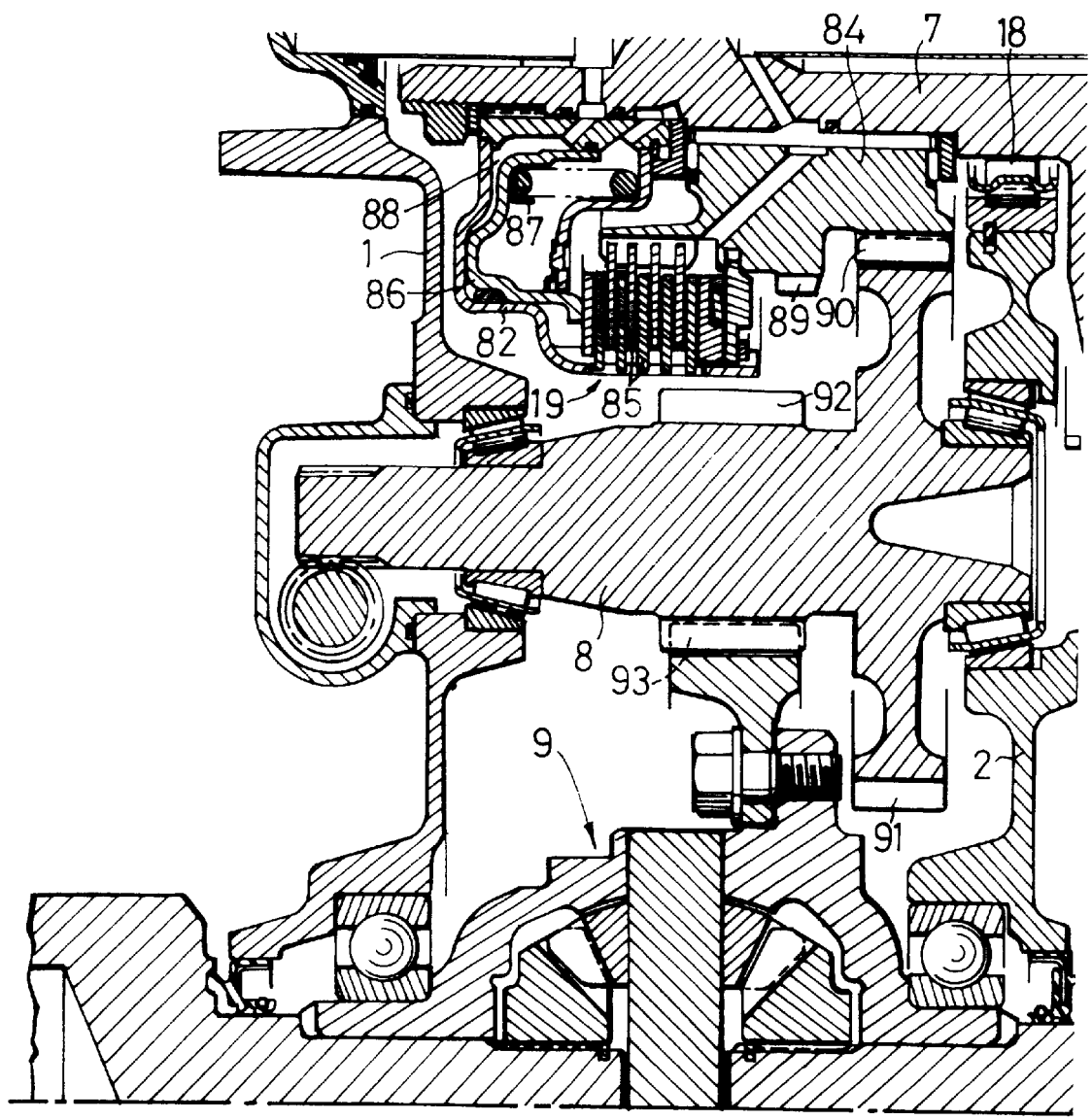
FIG. 5 is an enlarged view of a portion D shown in FIG. 1.
Figure 6:
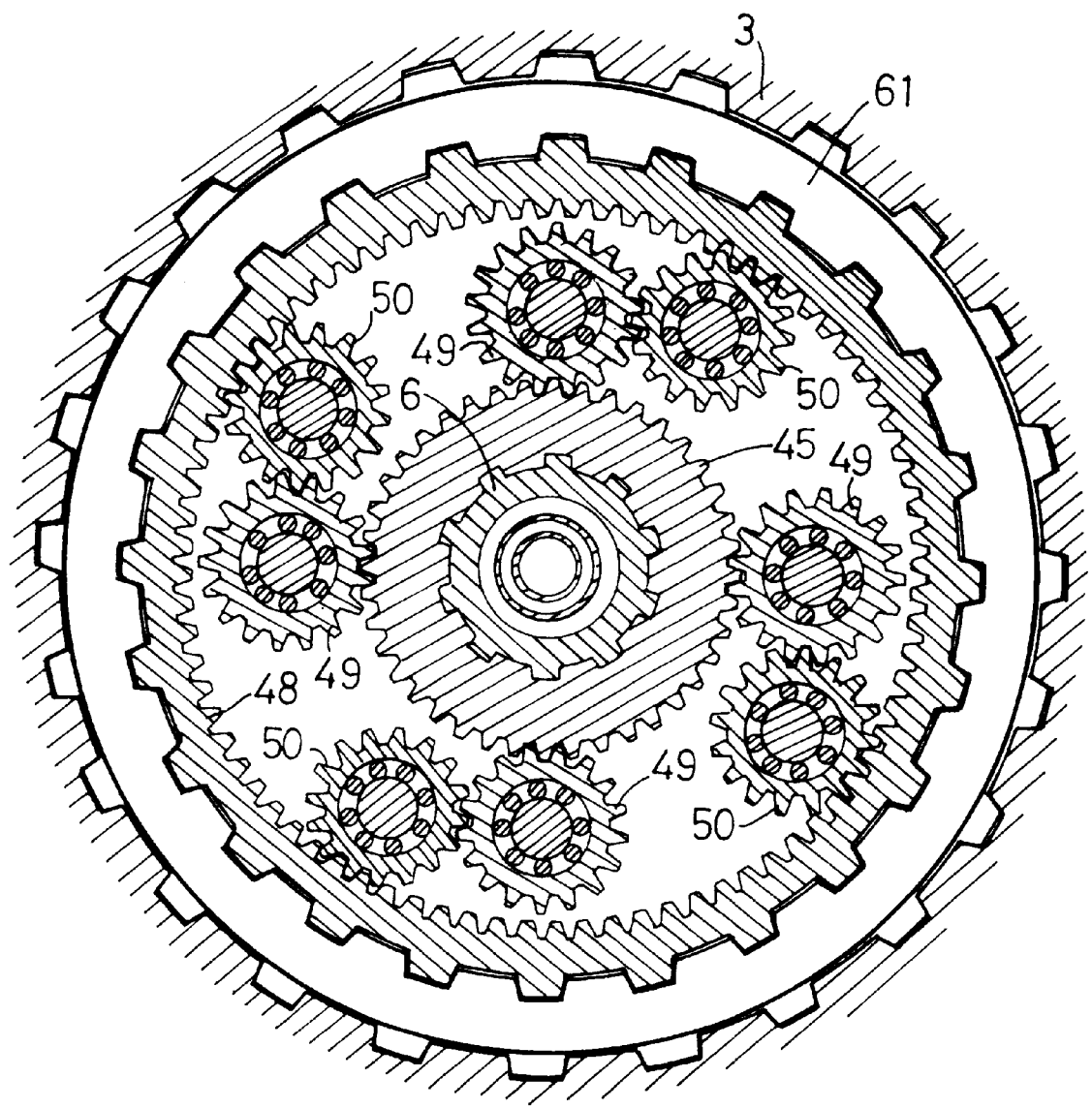
FIG. 6 is a sectional view taken along a line 6—6 in FIG. 3.
Figure 7:
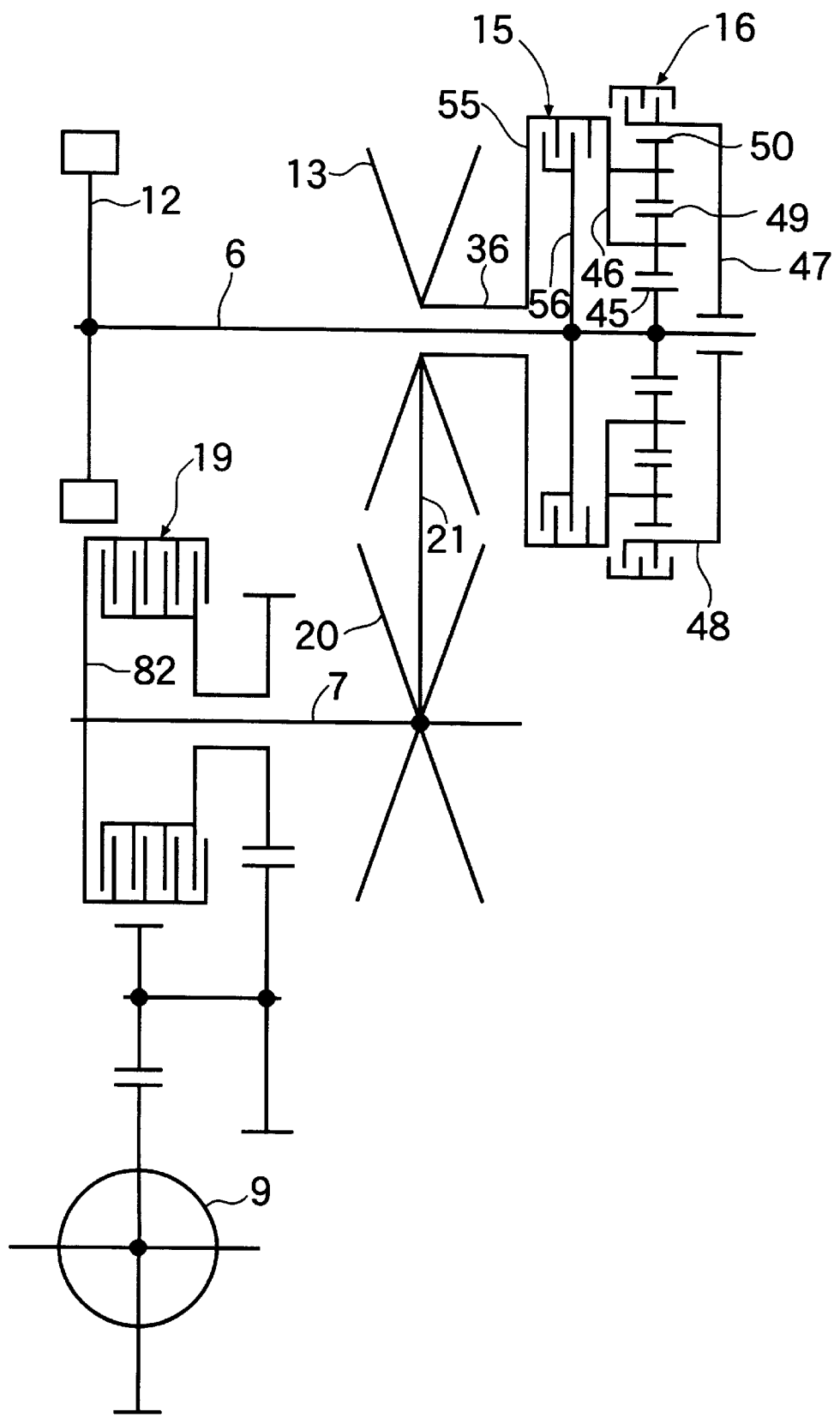
FIG. 7 is a skeleton diagram of the belt-type continuously variable transmission.

The structure of a belt-type continuously variable transmission will first be described with reference to FIGS. 1 to 7.

The belt-type continuously variable transmission is connected to a right side of an engine laterally disposed at a front portion of a vehicle body of a vehicle, and includes a left casing 1 and a right casing 2 which are coupled to each other through a split surface extending in the longitudinal direction of the vehicle body. A narrower intermediate casing 3 and a right cover 4 are coupled in a superposed manner to a right side of the right casing 2. The belt-type continuously variable transmission includes a driving shaft 6 disposed coaxially with a crankshaft 5 of the engine, a driven shaft 7 disposed above and in rear of the driving shaft 6, and a secondary shaft 8 disposed below and in rear of the driven shaft 7. A differential 9 is disposed substantially below the secondary shaft 8.

The driving shaft 6 is supported by a ball bearing 10 mounted in the intermediate casing 3 and a ball bearing 11 mounted in the right casing 2, and is connected at its left end to a right end of the crankshaft 5 through a flywheel 12. A driving pulley 13 is mounted at an intermediate portion of the driving shaft 6, and a forward and backward travel switch-over mechanism is mounted at the right end of the driving shaft 6 and comprises a planetary gear-type reducing mechanism 14, a forward clutch 15 and a reverse brake 16.

The driven shaft 7 is supported by a ball bearing 17 mounted in the intermediate casing 3 and a roller bearing 18 mounted in the right casing 2, and includes a starting clutch 19 at its left end, which is comprised of a wet multi-plate type clutch having a high cooling performance, and a driven pulley 20 at its intermediate portion. The driving pulley 13 of the driving shaft 6 and the driven pulley 20 of the driven shaft 7 are connected to two metal rings $21_1$, $21_1$ by an endless belt 21 which is provided with a large number of metal elements $21_2$.

The flywheel 12 includes a disk-shaped first mass 25 secured to the right end of the crankshaft 5, a disk-shaped second mass 26 secured to the left end of the driving shaft 6 and opposed to the first mass 25, a plurality of springs 27 disposed between the first and second masses 25 and 26 and compressed by the relative rotation of the masses 25 and 26, and a friction force generating means 28 for generating a friction force by the relative rotation of the masses 25 and 26. A ball bearing 29 is mounted between the first and second masses 25 and 26 for supporting the masses 25 and 26 for relative rotation. A starter gear 30 is provided around an outer periphery of the first mass 25 and meshed with a pinion of a starter motor which is not shown.

A first oil pump driving gear 31 is secured to the left end of the driving shaft 6 and meshed with a second oil pump driving gear 33 which is secured to an input shaft of an oil pump 32 including a circumscribing gear pump. Thus, the oil pump 32 is driven by the rotation of the driving shaft 6.

The driving pulley 13 mounted on the driving shaft 6 includes a stationary pulley half 37 integral with a sleeve shaft 36 which is relatively rotatably carried on an outer periphery of the driving shaft 6 with a pair of needle bearings 34 and 35 interposed therebetween, and a movable pulley half 38 slidably carried on an outer periphery of the sleeve shaft 36 through a ball spline and movable toward and away from the stationary pulley half 37. An oil chamber 41 for urging the movable pulley half 38 toward the stationary pulley half 37 is defined by three components: a partition member 39 secured to the sleeve shaft 36, a partition member 40 secured to the movable pulley half 38, and the movable pulley half 38. A spring 42 is mounted under compression in the oil chamber 41 for applying a predetermined initial load to the endless belt 21.

A canceler 43 is defined between the partition member 39 of the sleeve shaft 36 and the partition member 40 of the movable pulley half 38, and is opposed to the oil chamber 41 with the partition member 39 interposed therebetween. An outlet end of a feed pipe 44 for feeding oil from the oil pump 32 opens directly into an inner peripheral portion of the canceler 43. Thus, by feeding the oil from the oil pump 32 through the feed pipe 44 directly to the canceler 43, a guide member required in the prior art for guiding the oil can be eliminated to provide a decrease in the number of parts. Unnecessary thrust force is prevented from being applied to the movable pulley half 38 by allowing the centrifugal force acting on the oil supplied into the canceler 43 to oppose the centrifugal force acting on the oil remaining within the oil chamber 41.

The planetary gear-type reducing mechanism 14 of the forward and backward travel switch-over mechanism mounted at the right end of the driving shaft 6 includes a sun gear 45 spline-coupled to the driving shaft 6, a planetary carrier 46 relatively rotatably carried at its inner periphery on the driving shaft 6, a ring gear 48 formed around an outer periphery of a ring gear side-plate 47 relatively rotatably carried at its inner periphery on the driving shaft 6, and inner planetary gears 49 and outer planetary gears 50 which are carried on the planetary carrier 46. The inner planetary gears 49 and outer planetary gears 50 are meshed with each other. The inner planetary gears 49 are meshed with the sun gear 45, while the outer planetary gears 50 are meshed with the ring gear 48.

The inner periphery of the planetary carrier 46 and the inner periphery of the ring gear side-plate 47 are supported between a right side of the sun gear 45 spline-coupled to the driving shaft 6 and a thrust washer 51 secured to the right end of the driving shaft 6 with three thrust bearings 52, 53 and 54 interposed therebetween. More specifically, the left side of the inner periphery of the planetary carrier 46 is superposed onto the right side of the sun gear 45 with the thrust bearing 52 interposed therebetween; the left side of the inner periphery of the ring gear side-plate 47 is superposed onto the right side of the inner periphery of the planetary carrier 46 with the thrust bearing 53 interposed therebetween; and the left side of the thrust washer 51 is superposed onto the right side of the inner periphery of the ring gear side-plate 47 with the thrust bearing 54 interposed therebetween.

The forward clutch 15 of the forward and backward travel switch-over mechanism includes a clutch outer member 55 secured to the right end of the sleeve shaft 36 and coupled to the outer periphery of the planetary carrier 46, a clutch inner member 56 coupled to the sun gear 45, a plurality of friction plates 57 disposed between the clutch outer member 55 and the clutch inner member 56, a clutch piston 58 accommodated in the clutch outer member 55 and capable of urging the friction plates 57, and a spring 59 for urging the clutch piston 58 back. If the oil is supplied to an oil chamber 60 defined between the clutch outer member 55 and the clutch piston 58 to drive the clutch piston 58, the friction plates 57 are brought into close contact with one another, whereby the clutch outer member 55 and the clutch inner member 56 are integrated, and the sleeve shaft 36 is coupled to the driving shaft 6, so that the driving pulley 13 is rotated in unison with the driving shaft 6.

The reverse brake 16 of the forward and backward travel switch-over mechanism includes a plurality of friction plates 61 disposed between the outer periphery of the ring gear 48 and the inner periphery of the intermediate casing 3, a brake piston 62 slidably supported on the intermediate casing 3 and capable of urging the friction plates 61, and springs 63 for urging the brake piston 62 back. If the oil is supplied to an oil chamber 64 defined between the brake piston 62 and the intermediate casing 3 to drive the brake piston 62, the friction plates 61 are brought into close contact with one another, whereby the ring gear 48 is coupled to the intermediate casing 3. This causes the rotation of the driving shaft 6 to be transmitted through the sun gear 45, the inner planetary gears 49, the outer planetary gears 50 and the planetary carrier 46 to the clutch outer member 55. Thus, the rotation of the driving shaft 6 is reversed and transmitted to the driving pulley 13.

The ball bearing 10 supporting the driving shaft 6 and the sleeve shaft 36 is interposed between the intermediate casing 3 and a bearing holder 66 fixed by a bolt 65 which passes through the intermediate casing 3. The heads of the bolts 65 are disposed within the oil chamber 64 in the reverse brake 16, whereby the outside diameter of the brake piston 62 can be reduced to provide compactness of the reverse brake 16, as compared with the case where the oil chamber 64 is defined radially outside of the bolt 65.

The following oil passages are defined by two oil feed pipes coaxially fitted into the right end of the driving shaft 6: an oil passage 67 for feeding oil into the oil chamber 41 in the driving pulley 13; an oil passage 68 for feeding oil into the oil chamber 60 in the forward clutch 15; and an oil passage 69 for lubricating the forward clutch 15. The oil flowing from the oil passage 67 into the space between the driving shaft 6 and the sleeve shaft 36 is diverted to the left and right to flow along the outer periphery of the driving shaft 6 to lubricate the pair of needle bearings 34 and 35.

A pair of seal rings 70 and 71 are provided on the left side of the left needle bearing 35, and an intermediate position between both the seal rings 70 and 71 communicates with an oil passage 72 defined in the left end of the driving shaft 6. Therefore, a portion of the oil which has lubricated the left needle bearing 35 is passed through the right seal ring 70 and blocked by the left seal ring 71, and then flows into the oil passage 72 to lubricate the spline-coupled portion of the first oil pump driving gear 31.

The stationary pulley half 75 of the driven pulley 20 is integrally formed on the driven shaft 7, and the movable pulley half 76 is slidably carried on the outer periphery of the driven shaft 7 through a ball spline. An oil chamber 79 for urging the movable pulley half 76 toward the stationary pulley half 75 is defined by the following three components: a partition member 77 secured to the driven shaft 7; a partition member 78 secured to the movable pulley half 76; and the movable pulley half 76. A spring 80 is mounted under compression in the oil chamber 79 for applying a predetermined initial load to the endless belt 21. A canceler 81 is defined between the partition member 77 of the driven shaft 7 and the partition member 78 of the movable pulley half 76 and is opposed to the oil chamber 79 with the partition member 77 interposed therebetween.

The starting clutch 19 mounted at the left end of the driven shaft 7 includes a clutch outer member 82 secured to the driven shaft 7, a clutch inner member 84 relatively rotatably carried on the outer periphery of the driven shaft 7 with a pair of needle bearings 83, 83 interposed therebetween, a plurality of friction plates 85 disposed between the clutch outer member 82 and the clutch inner member 84, a clutch piston 86 accommodated within the clutch outer member 82 and capable of urging the friction plates 85, and a spring 87 for urging the clutch piston 86 back. If the oil is supplied into an oil chamber 88 defined between the clutch outer member 82 and the clutch piston 86 to drive the clutch piston 86, the friction plates 85 are brought into close contact with one another to couple the clutch outer member 82 and the clutch inner member 84 to each other, so that the clutch inner member 84 is rotated in unison with the driven shaft 7.

A parking gear 89 and an output gear 90 are integrally formed on the clutch inner member 84. A first intermediate gear 91 and a second intermediate gear 92 are integrally formed on the secondary shaft 8. The first intermediate gear 91 is meshed with the output gear 90, and the second intermediate gear 92 is meshed with a final gear 93 of the differential 9.

The belt-type continuously variable transmission having the above-described structure is capable of transmitting the rotation of the crankshaft 5 of the engine through a path of the flywheel 12→the forward clutch 15→the sleeve shaft 36→the driving pulley 13→the endless belt 21→the driven pulley 20→the driven shaft 7→the starting clutch 19→the output gear 90→the first intermediate gear 91→the second intermediate gear 92→the final gear 93→the differential 9 to drive left and right axles in a normal rotation to thereby drive the vehicle forwards by bringing the forward clutch 15 of the forward and backward travel switch-over mechanism into an engaged state to directly couple the sleeve shaft 36 carrying the driving pulley 13 to the driving shaft 6 and bringing the starting clutch 19 into an engaged state to couple the output gear 90 to the driven shaft 7.

If the reverse brake 16 is brought into an engaged state in place of the forward clutch 15, the rotation of the driving shaft 6 is decelerated, as described above, and is transmitted in the form of reversed rotation to the driving pulley 13, whereby the left and right axles are driven in reverse rotation to drive the vehicle backwards.

When the vehicle is driven forwards or backwards in the above manner, the groove width of one of the driving pulley 13 and the driven pulley 20 can be increased and the groove width of the other can be decreased to continuously vary the shift ratio of the driving force transmitted from the driving shaft 6 to the driven shaft 7 by providing a difference between the hydraulic pressure applied to the oil chamber 41 in the driving pulley 13 and the hydraulic pressure applied to the oil chamber 79 in the driven pulley 20.

In the belt-type continuously variable transmission having the above-described arrangement, the inclination angle of V-grooves in the driving pulley 13 and the driven pulley 20 (the angle which is formed by the plane of rotation of the pulley and the pulley/belt contact surface which will be referred to as a V-groove inclination angle α hereinafter) is set at 8°. The reason will be described below.

Figure 8:
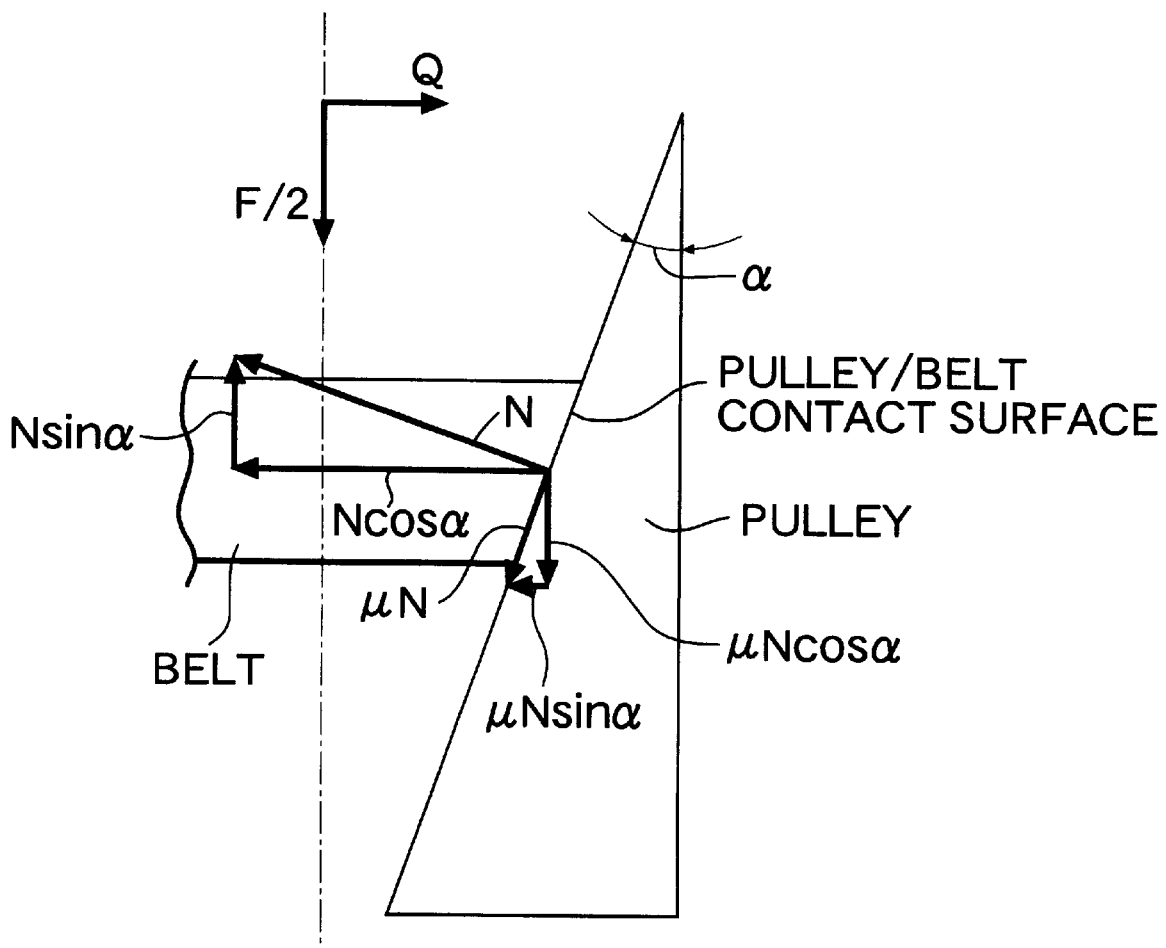
FIG. 8 is an illustration for explaining the balance of forces applied to an endless belt.

FIG. 8 is an illustration for explaining the balance of a force applied to the endless belt 21, where:

α: V-groove inclination angle;

μ: Friction coefficient between the pulley and the endless belt;

N: Vertical drag received by the endless belt from the pulley;

F: Urging force permitting the endless belt to be urged by its tensile force against the pulley; and Q: Axial thrust force of the pulley generated by hydraulic pressure wherein each of N, F and Q is a value per unit center angle of the pulley.

A frictional force μN depending upon the vertical drag N and the friction coefficient μ, is applied between the pulley and the endless belt. The frictional force is directed radially inwards as shown, when the endless belt is intended to move radially outwards of the pulley, and the frictional force is directed radially outwards, when the endless belt is intended to move radially inwards of the pulley.

An axial load received by the endless belt from the pulley is represented by N cos α+μN sin α, and balanced with an axial thrust force Q of the pulley generated by the hydraulic pressure.

$$Q = N\cos\alpha + \mu N \sin\alpha \qquad (1)$$

A radial load received by the endless belt from the pulley is represented by N sin α−μN cos α and is balanced with one half (F/2) of the urging force F provided by the tensile force of the endless belt, where the sum total of the radial loads received by the left and right opposite ends of the endless belt from the pulley is balanced with the urging force F.

$$F/2 = N\sin\alpha - \mu N\cos\alpha \qquad (2)$$

Here, a necessary condition for moving the endless belt radially outwards upon generation of the axial thrust force Q is that when Q is a positive value, F is a positive value. In other words, it is required that the friction coefficient μ and the V-groove inclination angle α satisfy the following relationship:

If the equation (1) is solved for N and replaced into equation (2), the following equation (3) is provided:

$$F/2 = Q(\sin\alpha - \mu\cos\alpha)/(\cos\alpha + \mu\sin\alpha) \qquad (3)$$

wherein Q is a positive value and 0°<α<90° and hence, cos α+μ sin α also assumes a positive value. Eventually, to ensure that F is a positive value, the following expression need only be satisfied:

$$\sin\alpha - \mu\cos\alpha > 0 \qquad (4)$$

Thus, $$\tan\alpha > \mu \qquad (5)$$

is provided from equation (4).

The expression (5) means that in order to move the endless belt radially outwards by biasing the movable pulley half of the pulley relative to the stationary pulley half by the hydraulic pressure, it is necessary to satisfy the condition of tan α>μ. Namely, if the V-groove inclination angle α is larger, a force for urging the endless belt into a wedge-formed shape radially outwards of the pulley by the axial thrust force provided by the hydraulic pressure overcomes the frictional force between the endless belt and the pulley and hence, the endless belt can be moved radially outwards. However, when the V-groove inclination angle α is smaller, a force for urging the endless belt in a wedge-formed shape radially outwards of the pulley by the axial thrust force provided by the hydraulic pressure is also smaller and hence, cannot overcome the frictional force between the endless belt and the pulley to move the endless belt radially outwards.

The friction coefficient μ between the pulley and the endless belt includes a static friction coefficient μs and a dynamic friction coefficient μa (μs>μa). Therefore, in order to move the endless belt radially outwards by the hydraulic pressure during stoppage of the pulley, it is necessary to satisfy the following expression (6):

$$\tan\alpha > \mu s \qquad (6)$$

and for this purpose, it is necessary to increase the V-groove inclination angle α. In order to move the endless belt radially outwards by the hydraulic pressure during rotation of the pulley, it is necessary to satisfy the following expression (7):

$$\tan\alpha > \mu a \qquad (7)$$

and the V-groove inclination angle α for this purpose may be small.

When the vehicle has been suddenly braked to stop the rotation of driven wheels in a state in which the ratio of the belt-type continuously variable transmission is not LOW, it is necessary to return the ratio to a LOW value to provide for the next start. In this case, if the belt-type continuously variable transmission does not have the starting clutch 19 on the driven shaft 7, but has the starting clutch 19 on the driving shaft 6, the driving pulley 13 and the driven pulley 20 of the belt-type continuously variable transmission are not rotated during stoppage of the vehicle with the starting clutch 19 being in its disengaged state. For this reason, unless the V-groove inclination angle α is set at a large value to satisfy the relation, tan α>μs, an extremely large hydraulic pressure is required for moving the endless belt 21 radially outwards of the driven pulley 20 to return the ratio to the LOW value.

However, the starting clutch 19 is provided on the driven shaft 7 in this embodiment and therefore, even during stoppage of the vehicle with the starting clutch 19 being it its disengaged state, the driving pulley 13 and the driven pulley 20 of the belt-type continuously variable transmission are being rotated. Thus, even if the V-groove inclination angle α is set at a small value to satisfy the relation, tan α>μa, the endless belt 21 can be moved radially outwards of the driven pulley 20 by a small hydraulic pressure to return the ratio to the LOW value.

Moreover, to return the ratio to the LOW value in a state in which the driving pulley 13 and the driven pulley 20 have been stopped, a hydraulic pressure of about four-times greater than the hydraulic pressure applied to the oil chamber 41 in the driving pulley 13 needs be applied to the oil chamber 79 in the driven pulley 20, but to return the ratio to the LOW value in a state in which the driving pulley 13 and the driven pulley 20 are being rotated, a hydraulic pressure about twice as large as the hydraulic pressure applied to the oil chamber 41 is sufficient.

By the provision of the starting clutch 19 on the driven shaft 7 as described above, the shifting can be easily performed in the state in which the driving pulley 13 and the driven pulley 20 are being rotated. Therefore, it is not required that the V-groove inclination angle α satisfies the relation, tan α>μs as in the prior art, and it is possible to use a V-groove inclination angle α which cannot be used in the prior art, namely, a V-groove inclination angle α satisfying the following relation:

$$\mu a < \tan\alpha < \mu s \qquad (8)$$

In other words, if the starting clutch 19 is provided on the driven shaft 7, the shifting can be performed even if the V-groove inclination angle α is set at a value less than a value used in the prior art, and a hydraulic pressure required for such shifting may be also small.

When the static friction coefficient μs is set at 0.17 and the dynamic friction coefficient μa is set at 0.08 based on the experimental values, a V-groove inclination angle α satisfying the expression (8) is in the following range:

$$4.57° < \alpha < 9.64° \quad (9)$$

In the conventional belt-type continuously variable transmission having the starting clutch 19 on the driving shaft 6, the V-groove inclination angle α is set at 11° for the above-described reason, whereas in the belt-type continuously variable transmission according to the present embodiment, the V-groove inclination angle α is set at 8° which is within the range represented by the expression (9).

If the V-groove inclination angle α is set at the small value as described above, the transmittable torque of the belt-type continuously variable transmission can be increased, while preventing the slipping between the pulley and the endless belt. This is because when the V-groove inclination angle α is set at the small value, the urging force F of the endless belt (the tensile force T of the endless belt) is substantially decreased relative to the same axial force, while the vertical drag N received from the pulley is varied only slightly. Hence, the vertical drag N received from the pulley can be increased while maintaining the urging force F (the tensile force T) of the endless belt in a range ensuring that the endless belt does not slip, providing an increase in transmittable torque. The reason will be described below in further detail.

If F/Q is calculated in equation (3) when the friction coefficient μr (a component of the dynamic friction coefficient μa in a radial direction of the pulley) is set at 0.07 in the case where the V-groove inclination angle α is equal to 11° and in the case where the V-groove inclination angle α is equal to 8°, F/Q is equal to 0.25 in the case of α=11°, and is equal to 0.14 in the case of α=8°. Herein, the influence of centrifugal force is disregarded.

Thus, if the axial thrust force Q of the pulley generated by the hydraulic pressure is equal to 1000 kgf, the urging force F permitting the endless belt to be urged by its tensile force (which will be referred to as a belt urging force F hereinafter) against the pulley is equal to 250 kgf in the case of α=11°, and is equal to 140 kgf in the case of α=8°.

Figure 9:
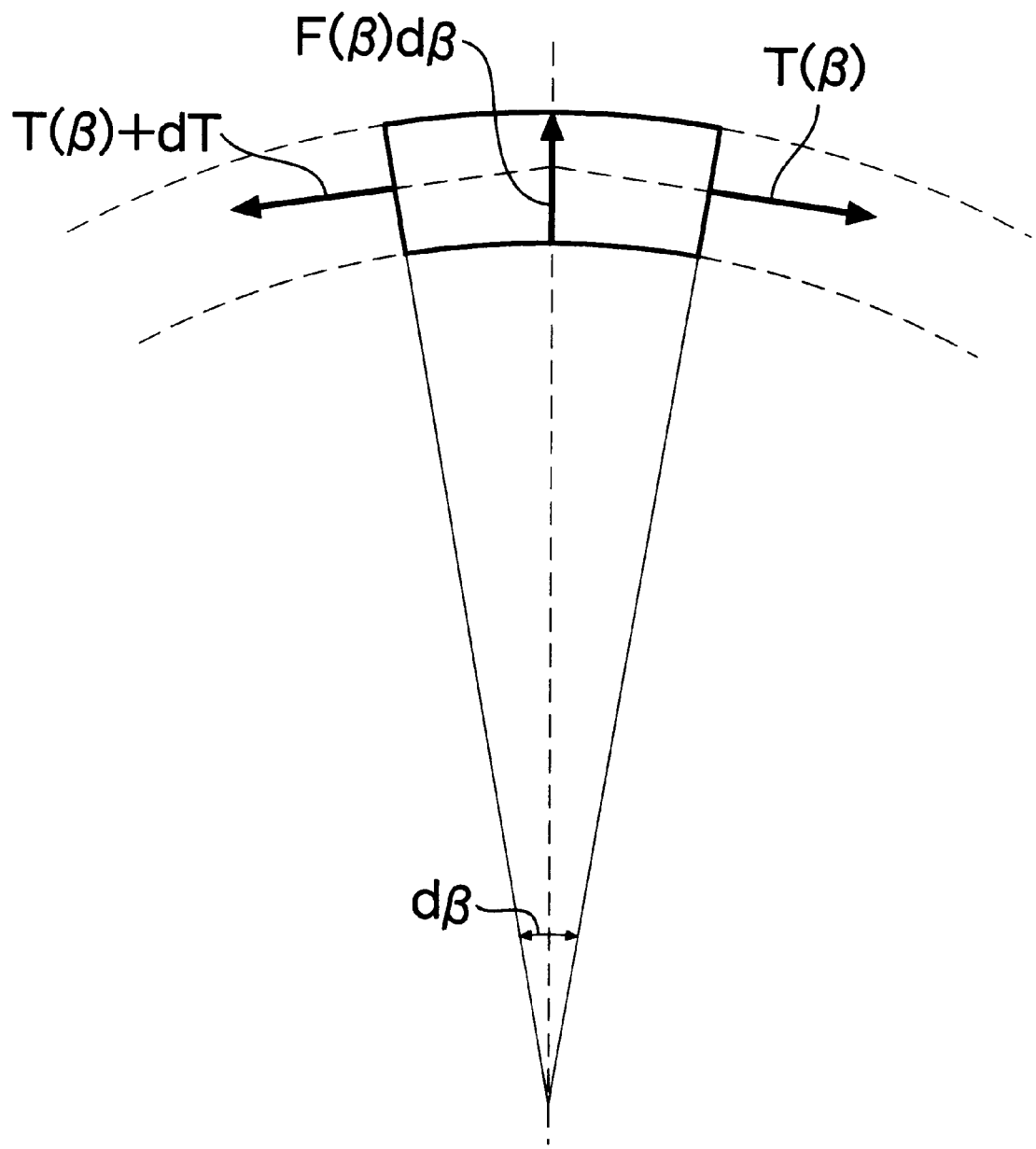
FIG. 9 is an illustration for explaining the relationship between the urging force and the tensile force of the endless belt.

If the balance of the radial force applied to a vary small area (an area having the center angle dβ) of the endless belt reeved around the pulley with a tensile force T as shown in FIG. 9 is considered, the following equation is established:

$$T(\beta) \sin (d\beta/2) + \{T(\beta) + dT\} \sin (d\beta/2) = F(\beta)d\beta \quad (10)$$

dβ is a very small angle and hence, if sin (dβ/2)=dβ/2, the equation (10) is changed to:

$$T(\beta) = F(\beta) \quad (11)$$

Namely, the above equation indicates that the belt urging force F is equal to the tensile force T of the endless belt. This indicates that when the tensile force T of the endless belt (i.e., the belt urging force F) is the same, the axial thrust force Q of the pulley (i.e., the transmittable torque Tin) assumes a greater value as the V-groove inclination angle α is smaller.

Figure 10A:
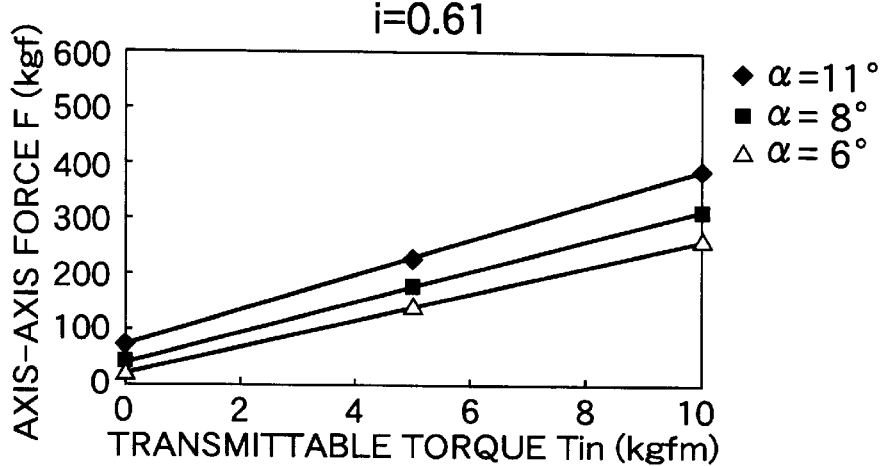
FIGS. 10A to 10C are graphs illustrating the relationship between the transmittable torque and the axis-axis force.
Figure 10B:
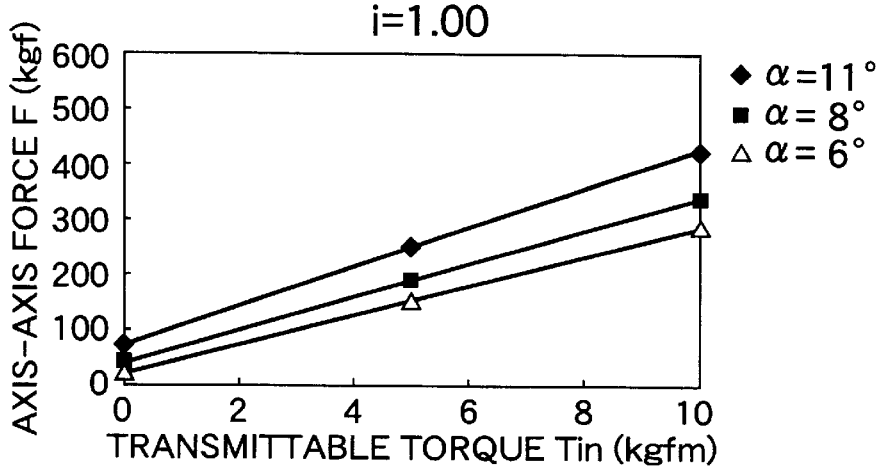
Figure 10C:
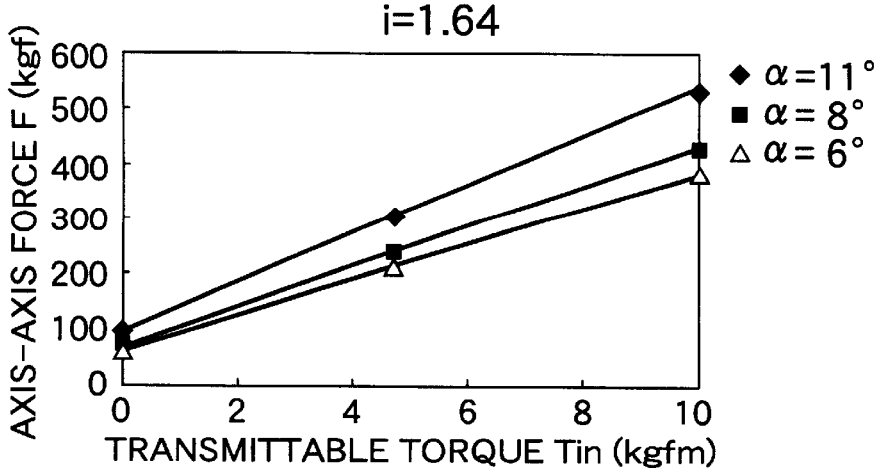

This is evident even from the graphs shown in FIGS. 10A to 10C in which the transmittable torque Tin of the belt-type continuously variable transmission is taken along the abscissa and the belt urging force F, which is in a positive correlation to the tensile force T of the endless belt, is taken along the ordinate. It can be seen that in any of the cases where the ratio i (of number of revolutions of the driving shaft/speed of number of revolutions of the driven shaft) is of 0.61, 1.00 and 1.64, the transmittable torque Tin is increased with respect to the same axis-axis force F (the tensile force T), as the V-groove inclination angle α is smaller.

Figure 11:
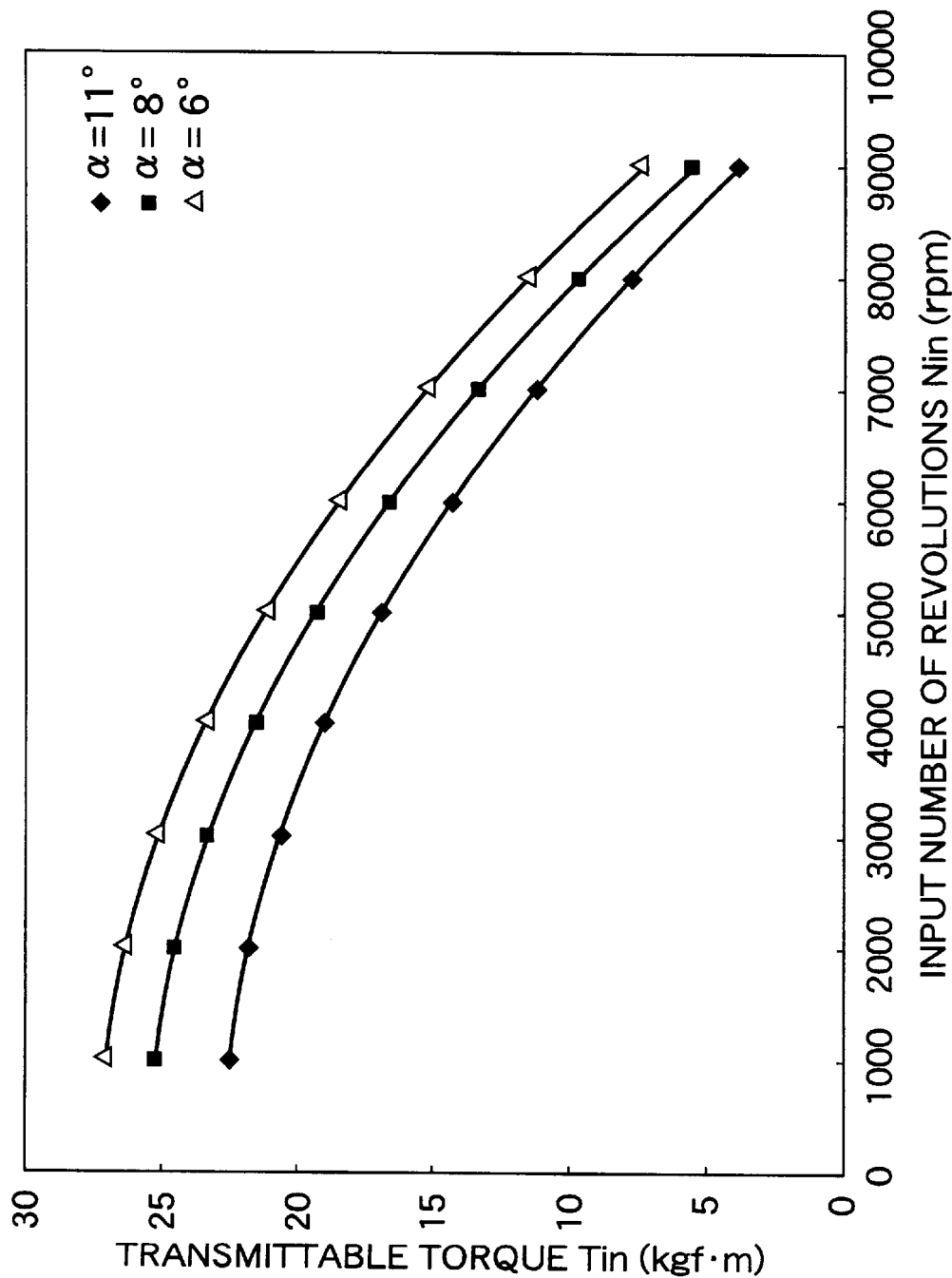
FIG. 11 is a graph illustrating the relationship between the input number of revolutions and the transmittable torque.

A graph in FIG. 11 shows the variation in transmittable torque Tin with respect to the input number of revolutions Nin (the number of revolutions of the driving shaft) for different V-groove inclination angles α, and it can be seen from FIG. 11 that as the V-groove inclination angle α is decreased in all ranges of the number of revolutions, the transmittable torque Tin is increased.

Figure 12:
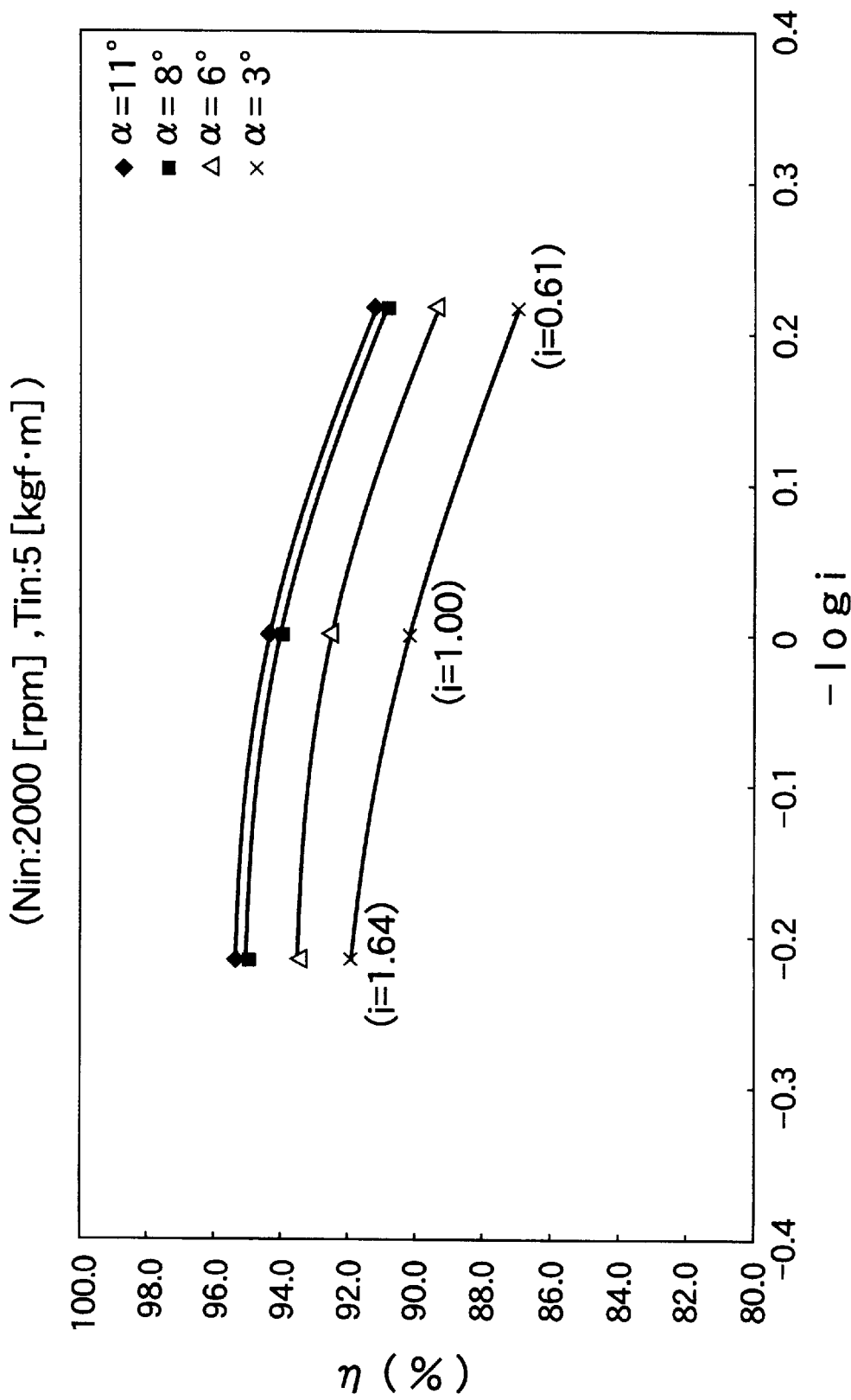
FIG. 12 is a graph illustrating the relationship between the ratio and the transmitting efficiency.
Figure 13:
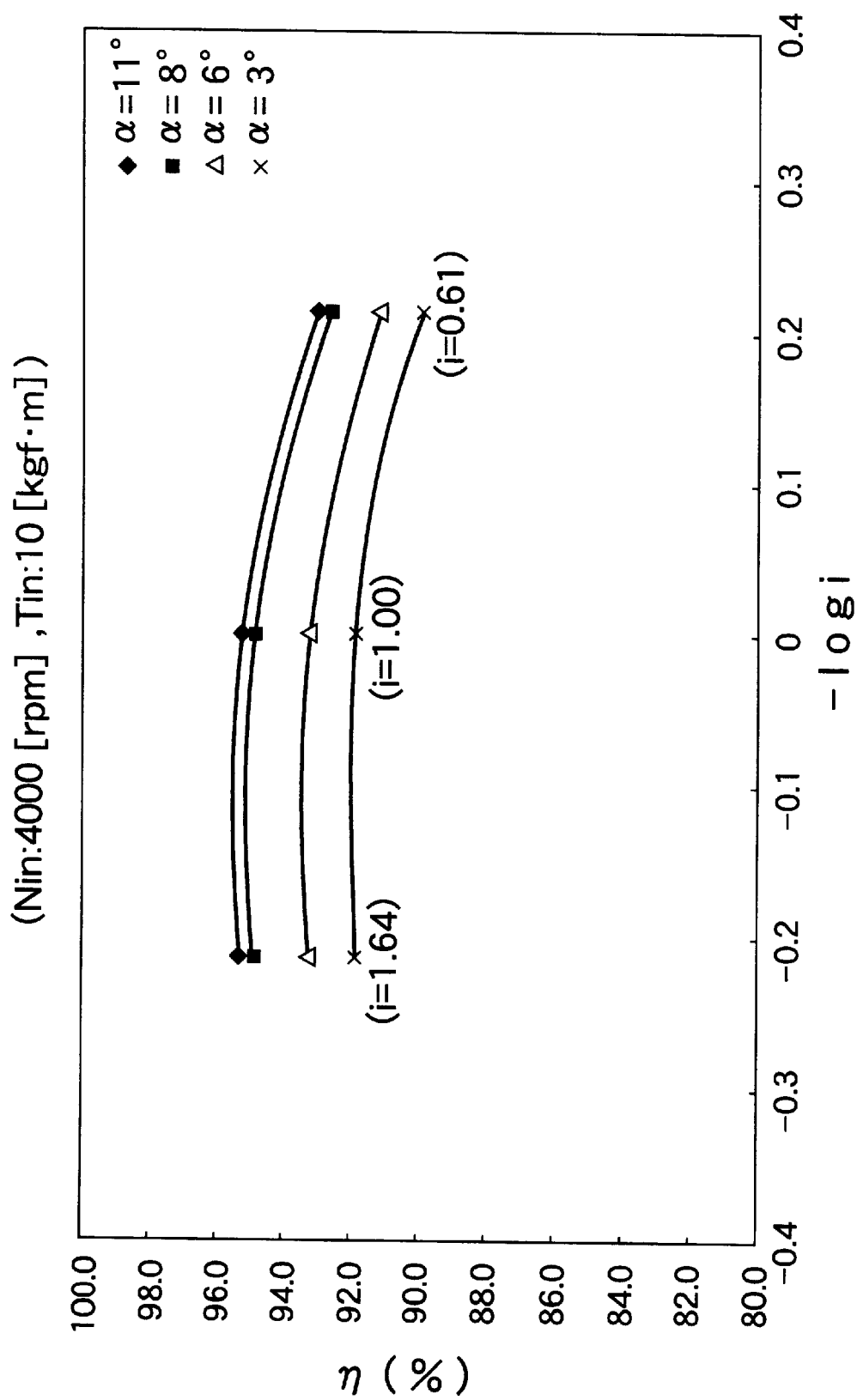
FIG. 13 is a graph illustrating the relationship between the ratio and the transmitting efficiency.

FIGS. 12 and 13 show the variation in transmitting efficiency η with respect to the ratio i for different V-groove inclination angles α, FIG. 12 corresponding to the case where the input number of revolutions Nin is 2000 rpm and the transmittable torque Tin is 5 kgfm, and FIG. 13 corresponding to the case where the input number of revolutions Nin is 4000 rpm and the transmittable torque Tin is 10 kgfm. As apparent from these graphs, as the V-groove inclination angle α is decreased, the transmitting efficiency η is reduced, but in a range of 4.57°<α<9.64° shown in the equation (9), the reduction in transmitting efficiency η is slight, which provides no hindrance for practical use.

From the foregoing, it is desirable that the V-groove inclination angle α permitting the transmittable torque Tin to be effective is increased while suppressing the reduction in transmitting efficiency η to the minimum and is set in a range of 5°<α<9° expecting errors during manufacturing and, in the present embodiment, such V-groove inclination angle α is set at 8°.

By the fact that the starting clutch 19 is provide on the driven shaft 7, as described above, the V-groove inclination angle α can be set at a small value falling within a range of μa<tan α<μs. Thus, the strength and sectional area of the material for the metal rings $21_1$, $21_1$ of the endless belt 21 can be increased, and the increase in axis-axis distance between the driving shaft 6 and the driven shaft 7 can be accepted to increase the diameters of the driving pulley 13 and the driven pulley 20. Therefore, the axial thrust force Q of the driving pulley 13 and the driven pulley 20 can be increased while avoiding an increase in tensile force T of the endless belt 21 without reducing the flexing stress of the metal rings $21_1$, $21_1$, thereby increasing the transmittable torque Tin without slipping of the endless belt 21.

In addition, the stroke of the pulley with respect to the same variation in ratio is reduced by decreasing the V-groove inclination angle α and therefore, axial dimension of the belt-type continuously variable transmission can be reduced in cooperation with the fact that the axial thickness of the pulley itself is decreased. Moreover, the amounts of movement of the movable pulley halves 38 and 76 required for providing the same variation in ratio may be small and hence, the misalignment between the driving pulley 13 and the driven pulley 20 (the deviation between the center line of the driving pulley 13 and the center line of the driven pulley 20) can be reduced. Further, if the transmittable torque Tin is constant, the amount of oil drawn and discharged with the same shift amount can be decreased and therefore, the responsiveness to the variation in ratio can be enhanced and moreover, the capacity of the oil pump 32 can be decreased to reduce the size of the belt-type continuously variable transmission and to provide an enhancement in efficiency by a reduction in load of the oil pump.

Figure 14:
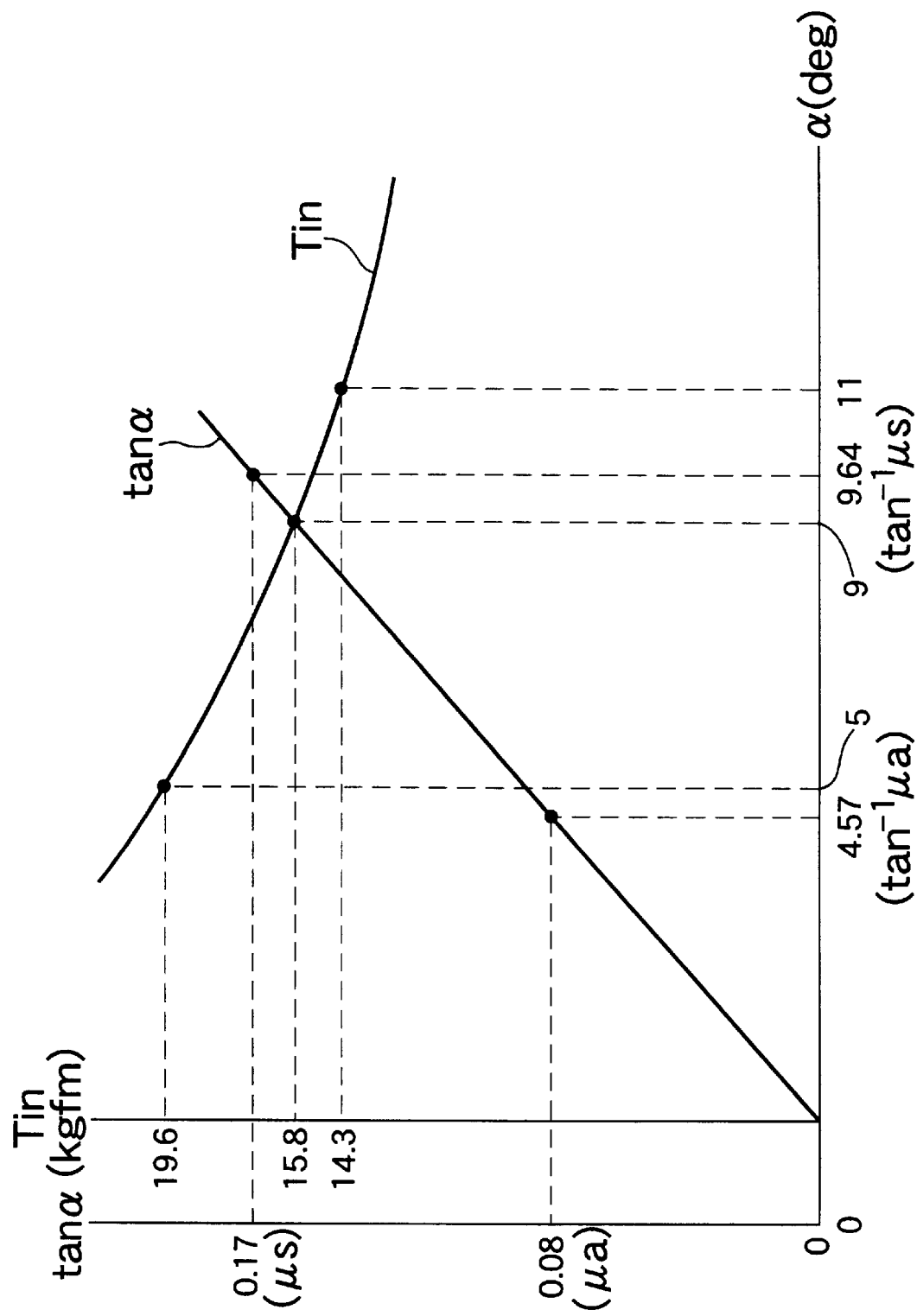
FIG. 14 is a graph illustrating the relationship between the inclination angle of a V-groove and the transmittable torque.
Figure 15:
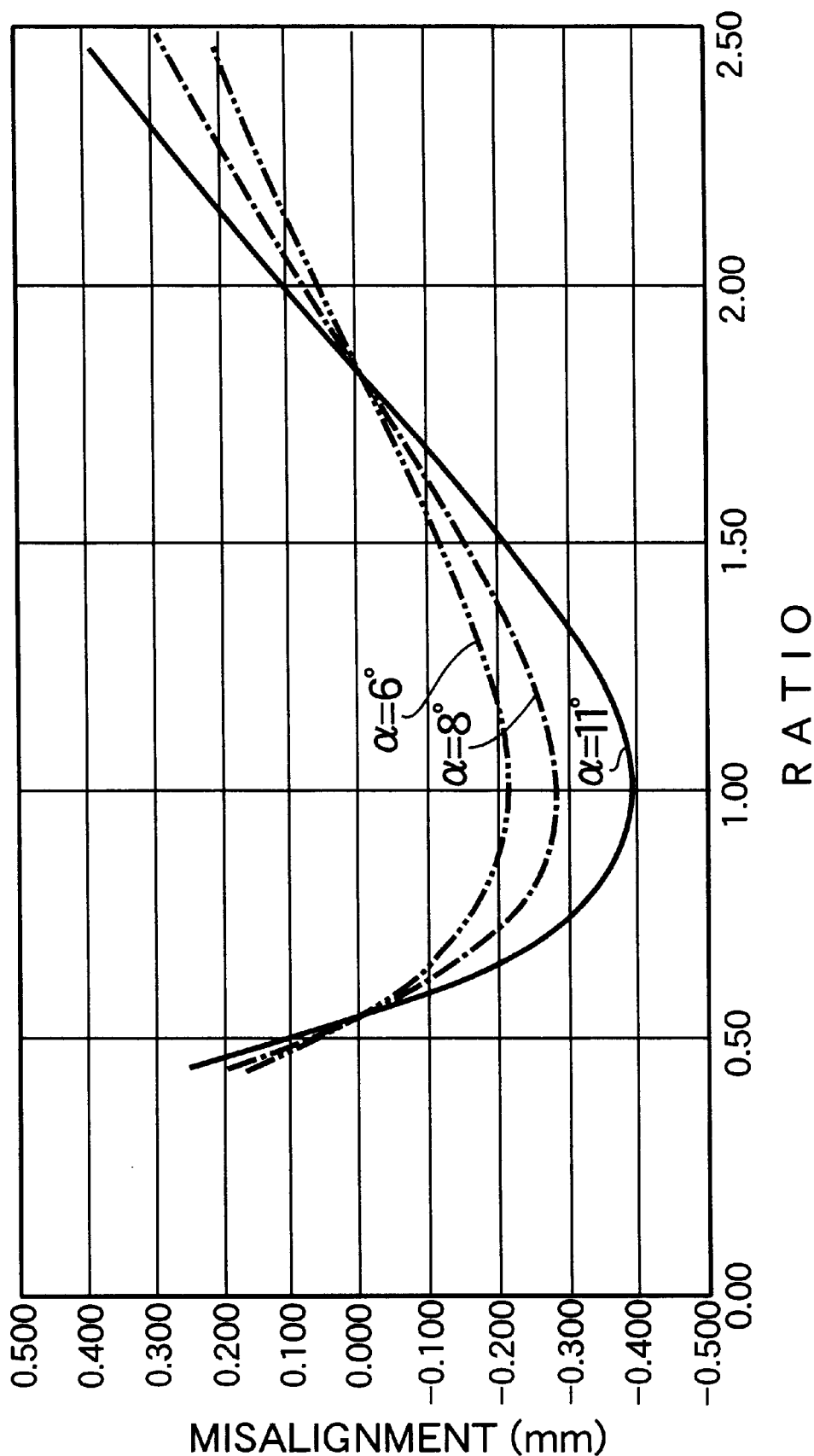
FIG. 15 is a graph illustrating the relationship between the ratio and the misalignment.

FIG. 14 shows the variation in transmittable torque Tin when the V-groove inclination angle α is varied. It can be seen from FIG. 14 that when α=11°, Tin=14.3, whereas when α=9°, Tin=15.8, and when α=5°, the transmittable torque Tin is increased to 19.6. FIG. 15 shows the relationship between the ratio and the misalignment when the V-groove inclination angle α is varied from 11° to 8° and 6°, and it can be seen from FIG. 15 that the misalignment is reduced with the decrease in V-groove inclination angle α.

Figure 16A:
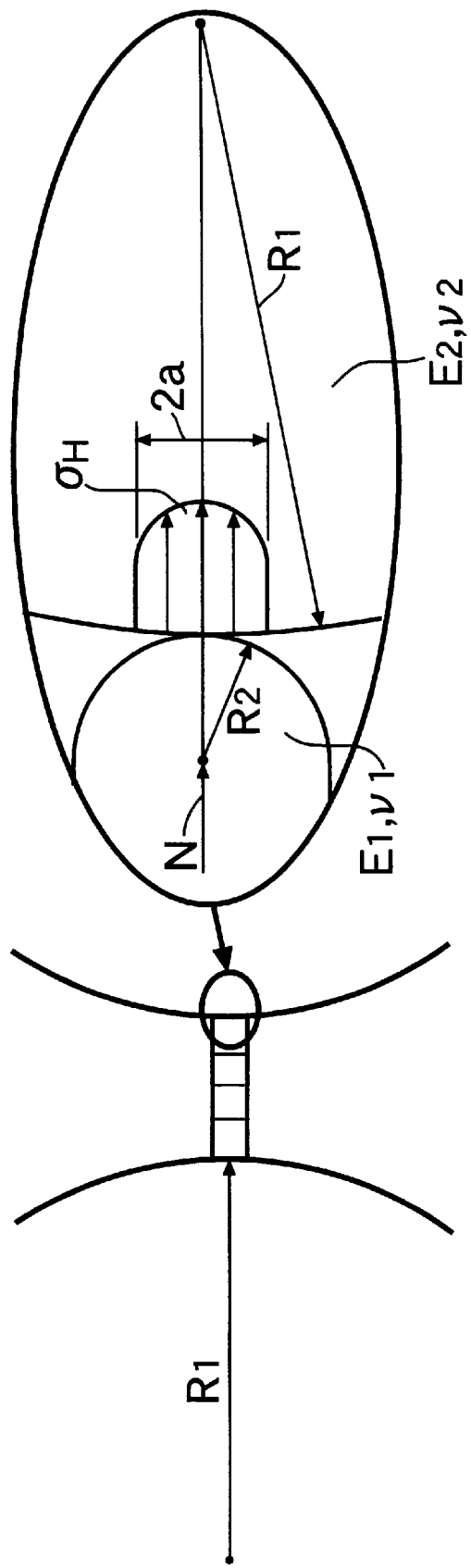
FIGS. 16A and 16B are illustrations for explaining a way for introducing the relationship between the inclination angle of the V-groove and the length of a side of an element as well as the hertz surface pressure.
Figure 16B:
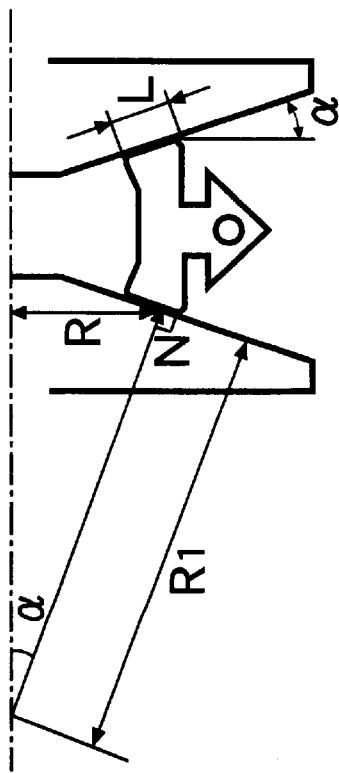

FIGS. 16A and 16B show the state of the contact area between the metal element and the pulley. If the distance from the rotational axis of the pulley to the contact portion is represented by R (effective radius of the pulley) and the V-groove inclination angle is represented by α, the radius $R_1$ of curvature of the V-face of the pulley is given according to the following equation:

$$R_1 = R/\sin\alpha \tag{12}$$

The side of the element and the V-face of the pulley are in line-contact with each other along a generating line of the pulley V-face, but in practice, the contact area between the element side and the pulley V-face is compressed by the vertical drag N into a band-formed shape having a width 2a. If the length of the element side (which will be referred to as an element side length hereinafter) is represented by L and the radius of curvature of the element side is represented by $R_2$, the a is provided according to the equation (13), and the hertz surface pressure $\sigma_H$ acting on the contact surface is provided according to the equation (14).

$$a = 2 \times \sqrt{\frac{\frac{N}{\pi L}\left(\frac{(1-v_1^2)}{E_1} + \frac{(1-v_2^2)}{E_2}\right)}{(1/R_1)+(1/R_2)}} \tag{13}$$

$$\sigma_H = 2N/\pi a L \tag{14}$$

wherein $\sigma_1$: Poisson's ratio of the element;
$v_2$: Poisson's ratio of the pulley;
$E_1$: Modulus of longitudinal elasticity of the element;
$E_2$: Modulus of longitudinal elasticity of the pulley.

The side of the element is actually a plane face and hence, if the $R_2=$ (i.e., $1/R_2=0$) and further, $v_1=v_2=v$ and $E_1=E_2=E$ in the equation (13), the equations (13 and 14) are changed respectively to the following equations:

$$a = \{8NR_1(1-v^2)/\pi EL\}^{1/2} \tag{15}$$

$$\sigma_H = \{NE/2\pi LR_1(1-v^2)\}^{1/2} \tag{16}$$

Here, if the equation (12) is replaced into the equation (16), $$\sigma_H = \{NE\sin\alpha/2\pi LR(1-v^2)\}^{1/2} \tag{17}$$

is provided. If the equation (17) is solved for the element side length L, $$L = NE\sin\alpha/2\pi\sigma_H^2 R(1-v^2) \tag{18}$$

is provided. As is apparent from the equation (17), if the modulus of longitudinal elasticity E and the Poisson's ratio ν are constant values, and when the same torque is transmitted at the same ratio (i.e., when the vertical drag N and the effective radius R of the pulley are constant values), the hertz surface pressure $\sigma_H$ is increased as the element side length L is decreased, and the hertz surface pressure $\sigma_H$ is increased as the V-groove inclination angle α is increased. If the hertz surface pressure $\sigma_H$ is increased, the durability of the pulley and the metal element is reduced and therefore, it is necessary to set an upper limit value for the hertz surface pressure $\sigma_H$. Conversely, if the hertz surface pressure $\sigma_H$ is decreased, the tensile force T of the endless belt 21 is increased and hence, it is also necessary to set a lower limit value for the hertz surface pressure $\sigma_H$.

Figure 17:
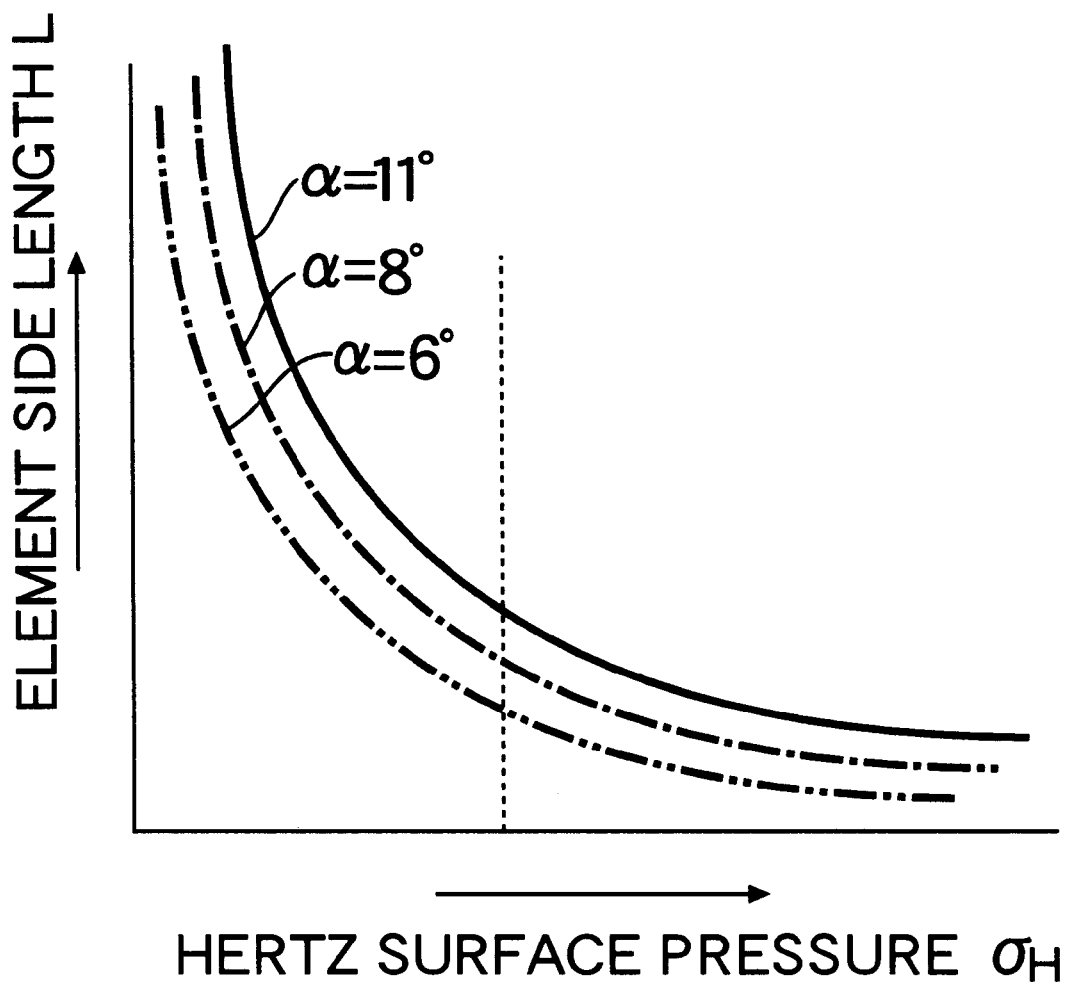
FIG. 17 is a graph illustrating the relationship between the hertz surface pressure and the length of the side of the element relative to the V-groove inclination angles.

As is apparent from the equation (18) and FIG. 17, when the hertz surface pressure the $\sigma_H$ is set at a certain value, the element side length L can be decreased as the V-groove inclination angle α is decreased. In addition, as the element side length L is decreased, the distance through which the metal element can be moved radially along the V-face of the pulley, is increased. Therefore, a large ratio range can be ensured, but also the frequency of contact of the side of the element with the V-face of the pulley can be reduced to enhance the durability of the pulley.

The setting of the upper and lower limit values of the hertz surface pressure $\sigma_H$ will now be described.

When the side of the element is brought into contact with the V-face of the pulley, the entire side of the element does not come into contact with the V-face of the pulley, and when the apparent element side length is represented by $L_B$, an element side length L (as described above), which is a value provided by multiplying the apparent element side length $L_B$ by the element contact efficiency η, is a length of actual contact of the element side with the V-face of the pulley.

$$L_B \eta = L \tag{19}$$

If the equations (17) and (18) are changed using the equations (12) and (19), $$\sigma_H = \{NE/2\pi\eta L_B R_1(1-v^2)\}^{1/2} \tag{20}$$

$$L_B = NE/2\pi\eta\sigma_H^2 R_1(1-v^2) \tag{21}$$

are provided.

The belt-type continuously variable transmission was operated under reference test conditions defined by ratio i=0.61
input number of revolutions Nin=6000 (rpm)
transmittable torque Tin=14.3 (kgfm)
excess torque Tm=2 (kgfm)
operating time t=400 (hr)
apparent element side length $L_B$=6.2 (mm)

and the limit of the durability of the element and pulley was tested.

If the reference hertz surface pressure $\sigma_H$ is calculated from the equation (20) on the assumption that V-face vertical drag N=19.5 kgf, Young's modulus E=21000 kgf/mm², radius of curvature of V-face $R_1$=212 mm (α=11°) and Poisson's ratio ν=0.3, $$\sigma_H^* = \eta^{-\frac{1}{2}} \times 7.32 \text{ (kgf/mm}^2) \tag{22}$$

is provided.

If the apparent element side length $L_B$ is set at 6.2 mm, the reference hertz surface pressure $\sigma_H^*$ is $\eta^{-\frac{1}{2}} \times 7.32$ kgf/mm² from the equation (22), but the result of the test showed that the hertz surface pressure $\sigma_H^*$ was a value leaving a margin for the upper limit value against the wear, and the apparent element side length $L_B$ can be further decreased.

Thereupon, as a result of a test carried out under a condition that the apparent element side length $L_B$ was gradually decreased from 6.2 mm, it was found that the apparent element side length $L_B$ equal to 3.8 mm was a limit value against the wear, and if $L_B$ is decreased to be less than such limit value, the amount of element and pulley wear exceeds a limit.

When the apparent element side length $L_B$ is equal to 3.8 mm, the hertz surface pressure $\sigma_H$ is provided according to the following equation (23) from the equation (20) on the basis of the reference hertz surface pressure $\sigma_H^*$ provided when the apparent element side length $L_B$ is equal to 6.2 mm:

$$\sigma_H = (6.2 \div 3.8)^{1/2} \sigma_H^* \; 1.3 \; \sigma_H^* \quad (23)$$

The equation (23) shows that the apparent element side length $L_B$ equal to 3.8 mm is a lower limit value against the wear, and the hertz surface pressure $\sigma_H$ at that time is 1.3 times the reference hertz surface pressure $\sigma_H^*$ at the time when the apparent element side length $L_B$ is equal to 6.2 mm.

Figure 18:
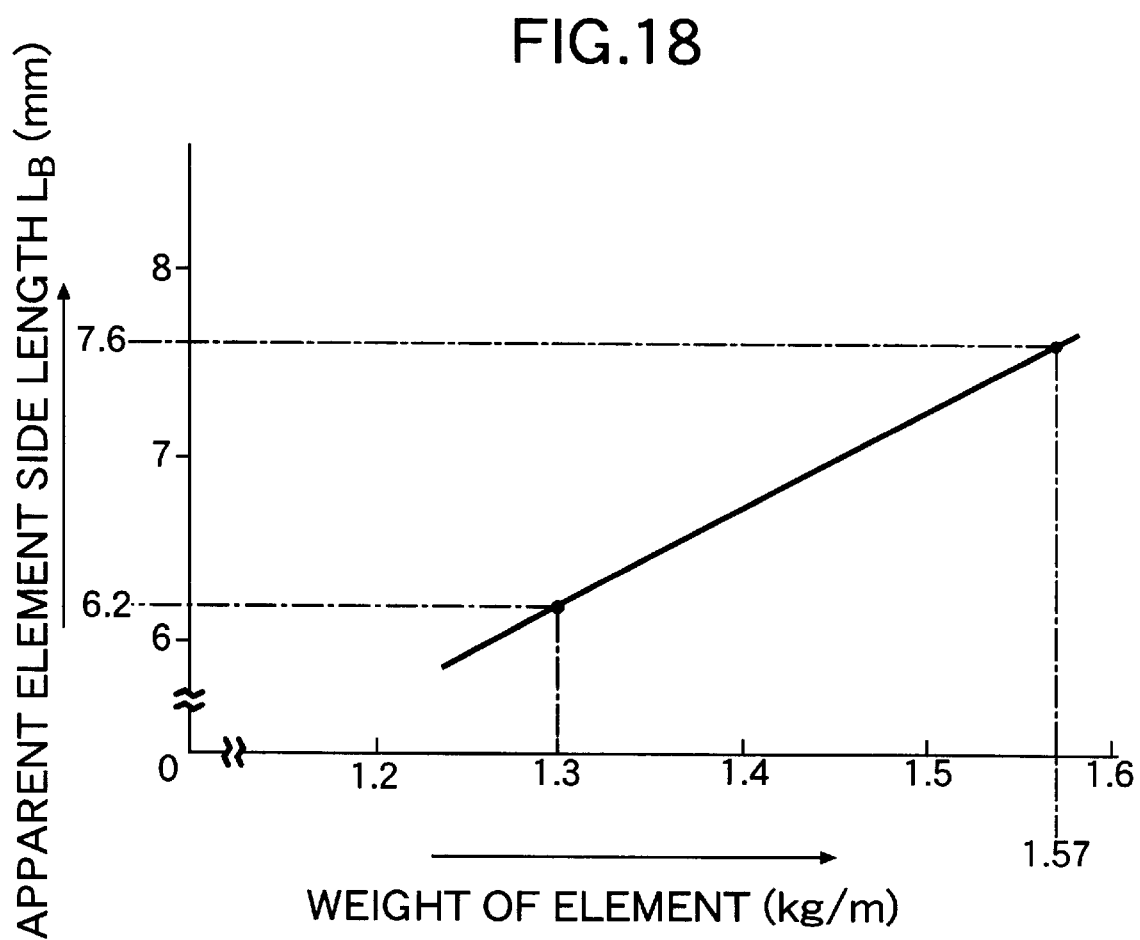
FIG. 18 is a graph illustrating the relationship between the apparent length of the side of the element and the weight of the element.

The setting of the upper limit value of the apparent element side length $L_B$ will be described below. As shown in FIG. 18, if the apparent element side length $L_B$ is increased, the size of the element is necessarily increased, resulting in an increased weight of the element. The weight of the element (weight per 1 m of the endless belt) corresponding to the apparent element side length $L_B$ equal to 6.2 mm under reference test conditions is of 1.3 kg/m, but if the apparent element side length $L_B$ is increased to be equal to 7.6 mm, the weight of the element is increased up to 1.57 kg/m.

Figure 19:
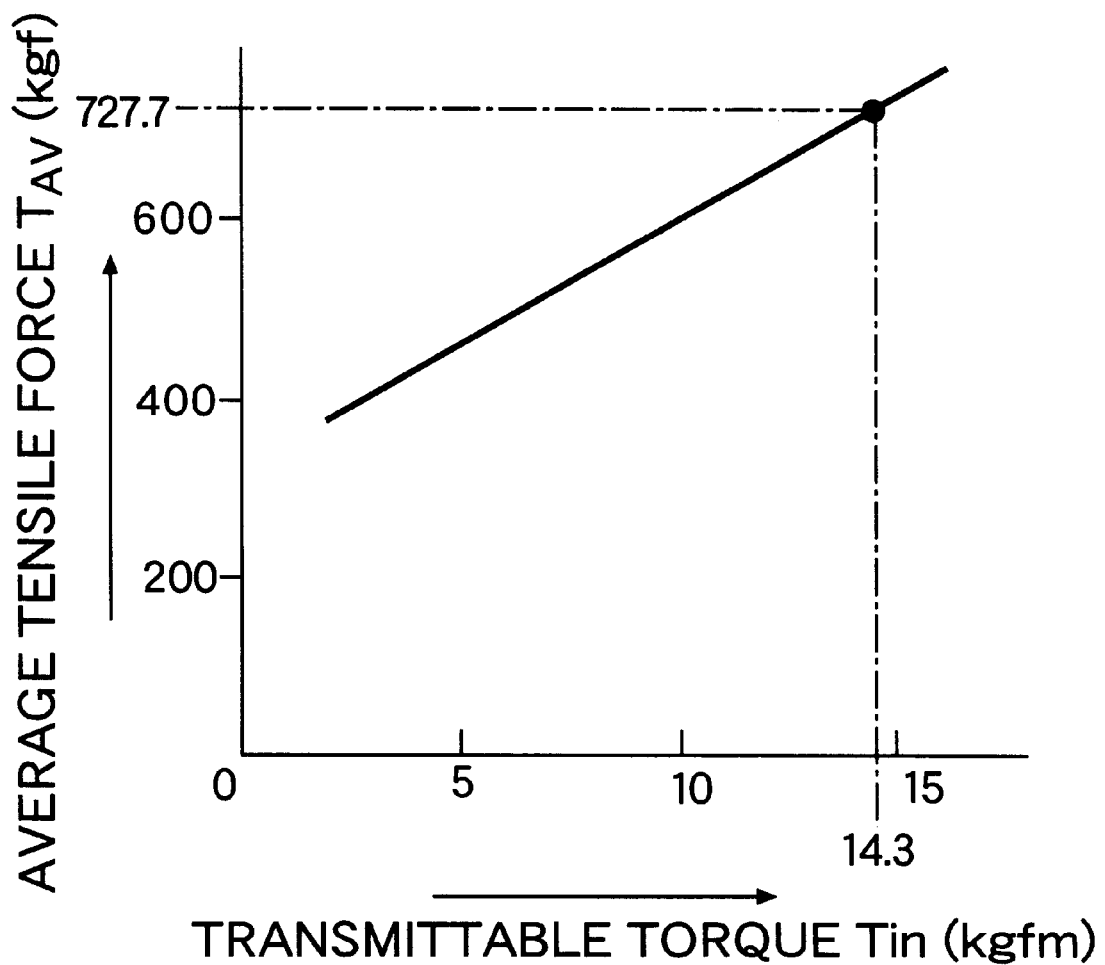
FIG. 19 is a graph illustrating the relationship between the transmittable torque and the average tensile force.

FIG. 19 shows the relationship between the transmittable torque Tin and the average tensile force Tav of the endless belt specifically, of the metal ring thereof when the belt-type continuously variable transmission has been operated under the reference test conditions, i.e., at the ratio i equal to 0.61, the input number of revolutions Nin equal to 6000 rpm, the excess torque Tm equal to 2 kgfm and the apparent element side length $L_B$ equal to 6.2 mm. The average tensile force Tav is increased with an increase in transmittable torque Tin, and when the transmittable torque Tin is equal to 14.3 kgfm, the average tensile force Tav is 727.7 kgf.

Figure 20:
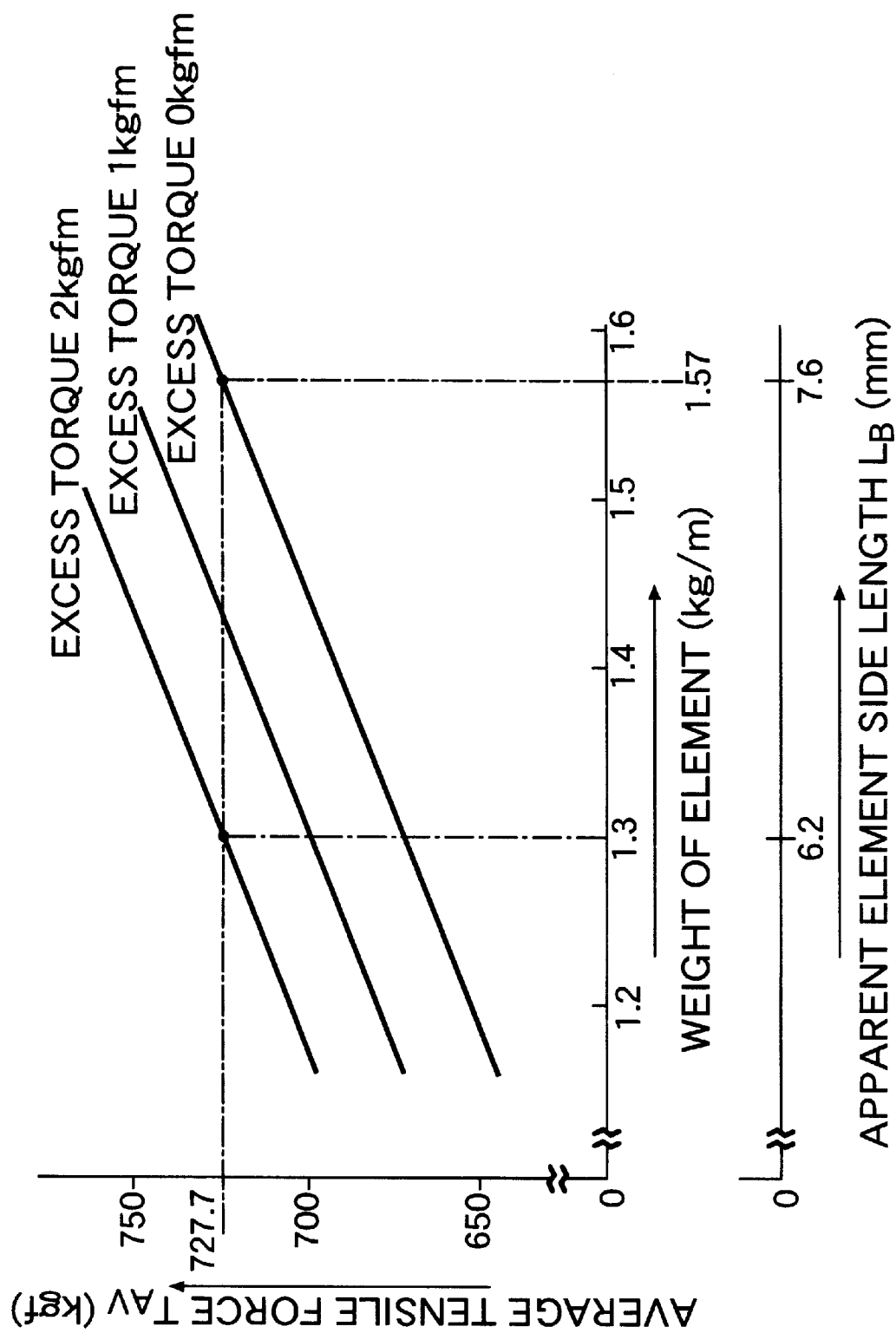
FIG. 20 is a graph illustrating the relationship between the apparent length of the side of the element and the average tensile strength.

FIG. 20 shows the relationship between the weight of the element (i.e., the apparent element side length $L_B$) and the average tensile force Tav with respect to a different excess torque Tm when the belt-type continuously variable transmission has been operated under the reference test conditions, i.e., at the ratio i equal to 0.61, the input number of revolutions Nin equal to 6000 rpm and the transmittable torque Tin equal to 14.3 kgfm. If the apparent element side length $L_B$ is set at 6.2 mm, which is a value under the reference test conditions, the average tensile force Tav can be suppressed to 727.7 kgf, while ensuring an excess torque Tm of 2 kgfm.

However, when the element side length $L_B$ is increased from 6.2 mm, it is necessary to decrease the excess torque Tm from 2 kgfm in order to suppress the average tensile force Tav to 727.7 kgf. When the element side length $L_B$ is increased up to 7.6 mm, the excess torque Tm is decreased down to 0 kgfm, if the average tensile force Tav is suppressed to 727.7 kgf. Therefore, the apparent element side length $L_B$ equal to 7.6 mm is an upper limit value defined by the average tensile force Tav.

Thus, the hertz surface pressure $\sigma_H$ at the time when the apparent element side length $L_B$ is equal to 7.6 mm is provided according to the following equation (24) from the equation (20) on the basis of the reference hertz surface pressure $\sigma_H^*$ at the time when the apparent element side length $L_B$ is equal to 6.2 mm.

$$\sigma_H = (6.2 \div 7.6)^{1/2} \sigma_H^* = 0.9 \; \sigma_H^* \quad (24)$$

The equation (24) shows that the apparent element side length $L_B$ equal to 7.6 mm is the upper limit value based on the average tensile force Tav, and the hertz surface pressure $\sigma_H$ at that time is 0.9 times the reference hertz surface pressure $\sigma_H^*$ at the time when the element side length $L_B$ is equal to 6.2 mm.

From the foregoing, the acceptable range of hertz surface pressure $\sigma_H$ is provided using the reference hertz surface pressure $\sigma_H^*$ according to the following expression:

$$0.9 \; \sigma_H^* < \sigma_H < 1.3 \; \sigma_H^* \quad (25)$$

If the expression (25) is changed for the apparent element side length $L_B$, using the equations (12), (21) and (22), $$19.5 \sin \alpha < L_B < 40.0 \sin \alpha \quad (26)$$

is provided, wherein $19.5 \sin \alpha$ is a lower limit value for the apparent element side length $L_B$ against the wear, and $40.0 \sin \alpha$ is an upper limit value for the apparent element side length $L_B$ based on the average tensile force Tav.

Figure 21:
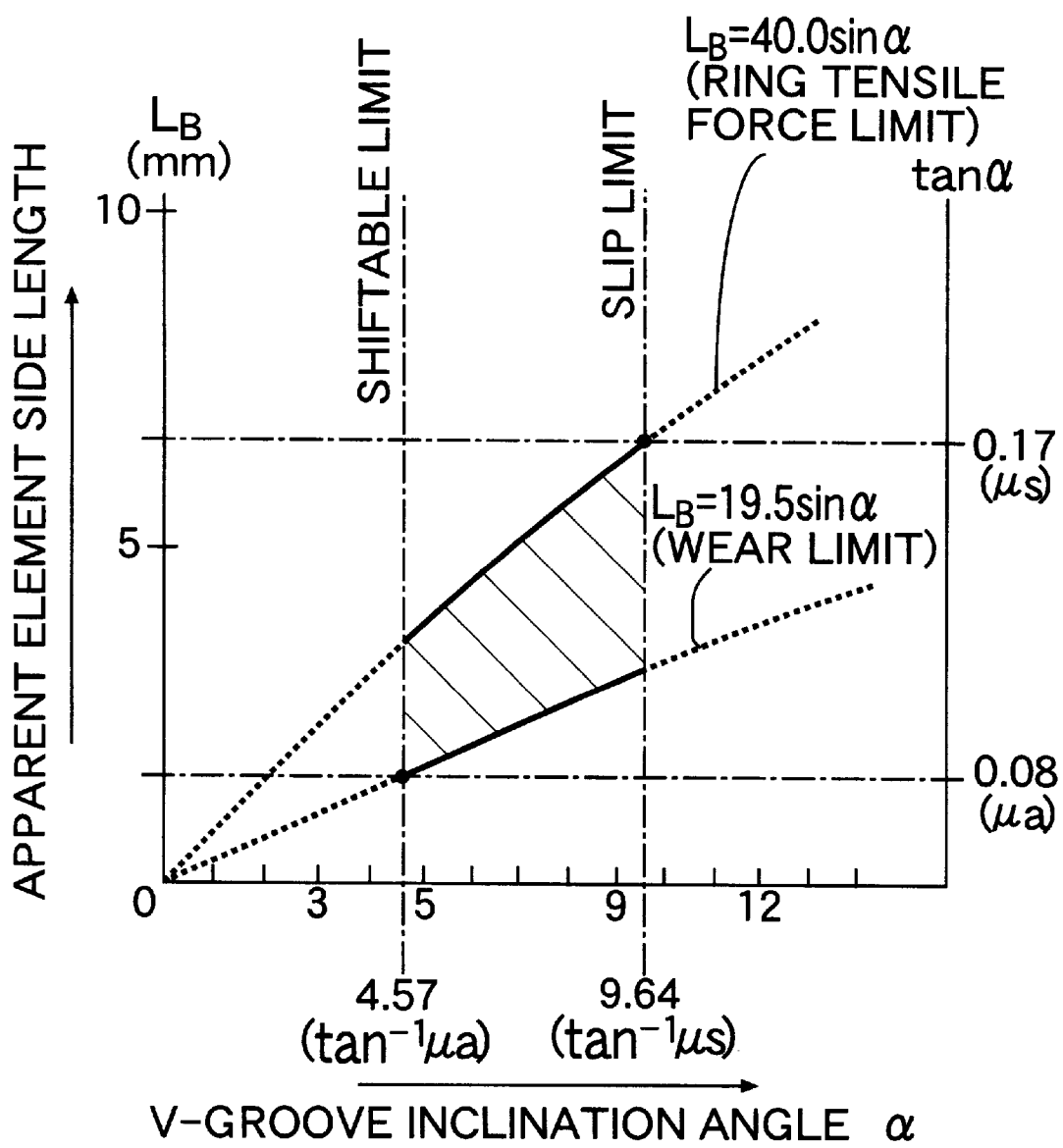
FIG. 21 is a graph illustrating the settable range of the apparent length of the side of the element.

From the foregoing, in a region where the V-groove inclination angle $\alpha$ is between a shiftable limit $\alpha$ equal to 4.57° and a slip limit $\alpha$ equal to 9.64°, an obliquely-lined area below a line defined by $L_B = 40.0 \sin \alpha$ and above a line defined by $L_B = 19.5 \sin \alpha$ is a settable area of the apparent element side length $L_B$ depending upon the V-groove inclination angle $\alpha$, as shown in FIG. 21.

Although the embodiment of the present invention has been described in detail, it will be understood that the present invention is not limited to the above-described embodiment, and various modifications in design may be made without departing the subject matter of the present invention.

For example, the belt-type continuously variable transmission for a vehicle has been illustrated in the embodiment, but the present invention is applicable to a belt-type continuously variable transmission for use in another application such as a machine tool or the like. The starting clutch 19 has been provided on the driven shaft 7 in the embodiment, but the shifting clutch may be provided on the driven shaft 7, and the starting clutch 19 may be provided on the driving shaft 6.

In summary, the element side length L is determined in accordance with the V-groove inclination angle $\alpha$ of the pulley and the hertz surface pressure $\sigma_H$ between the metal element and the pulley. Therefore, the element side length L can be determined at a minimum value to increase the ratio range, while preventing the increase in hertz surface pressure $\sigma_H$.

Furthermore, the element side length L can be determined at the minimum value, while preventing an excessive tensile force from acting on the metal ring.

What is claimed is:

1. A metal V-belt type continuously variable transmission, comprising an endless belt which has a large number of metal elements mounted on a metal ring and which is wrapped around a pair of pulleys, an inclination angle $\alpha$ of a V-groove in each said pulley being set in a range of:

$$\tan^{-1} \mu a < \alpha < \tan^{-1} \mu s,$$

where $\mu s$ represents a static friction coefficient between each said pulley and said metal element, and $\mu a$ represents a dynamic friction coefficient between each said pulley and said metal element, wherein a length L of a side of said metal element is determined in accordance with the inclination angle $\alpha$ of the V-groove in each said pulley and a hertz surface pressure $\sigma_H$ between said metal element and each said pulley.

2. A metal V-belt type continuously variable transmission according to claim 1, wherein said hertz surface pressure $\sigma_H$ is set at a value ensuring that a tensile force of said metal ring is equal to or less than a predetermined value, and the length L of the side of said metal element is determined in accordance with the inclination angle $\alpha$ of the V-groove.

* * * * *